United States Patent
Sun et al.

(10) Patent No.: US 11,670,299 B2
(45) Date of Patent: *Jun. 6, 2023

(54) WAKEWORD AND ACOUSTIC EVENT DETECTION

(71) Applicant: Amazon Technologies, Inc., Seattle, WA (US)

(72) Inventors: Ming Sun, Winchester, MA (US); Thibaud Senechai, Somerville, MA (US); Yixin Gao, Cambridge, MA (US); Anish N. Shah, Bedford, MA (US); Spyridon Matsoukas, Hopkinton, MA (US); Chao Wang, Newton, MA (US); Shiv Naga Prasad Vitaladevuni, Belmont, MA (US)

(73) Assignee: Amazon Technologies, Inc., Seattle, WA (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/321,999

(22) Filed: May 17, 2021

(65) Prior Publication Data

US 2021/0358497 A1 Nov. 18, 2021

Related U.S. Application Data

(63) Continuation of application No. 16/452,964, filed on Jun. 26, 2019, now Pat. No. 11,043,218.

(51) Int. Cl.
*G10L 15/22* (2006.01)
*G10L 15/16* (2006.01)

(52) U.S. Cl.
CPC .............. *G10L 15/22* (2013.01); *G10L 15/16* (2013.01)

(58) Field of Classification Search
CPC ......... G10L 15/22; G10L 15/16; G10L 15/08; G10L 25/21; G10L 25/87; G10L 2015/088; G06F 3/167
See application file for complete search history.

(56) References Cited

U.S. PATENT DOCUMENTS

| | | | |
|---|---|---|---|
| 5,638,487 A * | 6/1997 | Chigier | G10L 15/04 704/202 |
| 7,921,012 B2 * | 4/2011 | Fujimura | G10L 15/32 704/255 |
| 9,240,184 B1 * | 1/2016 | Lin | G10L 15/142 |
| 9,390,708 B1 * | 7/2016 | Hoffmeister | G10L 15/08 |
| 9,646,634 B2 * | 5/2017 | Sainath | G06N 3/0481 |
| 9,785,613 B2 * | 10/2017 | Natarajan | G10L 15/28 |

(Continued)

*Primary Examiner* — Mohammad K Islam
(74) *Attorney, Agent, or Firm* — Pierce Atwood LLP

(57) ABSTRACT

A system processes audio data to detect when it includes a representation of a wakeword or of an acoustic event. The system may receive or determine acoustic features for the audio data, such as log-filterbank energy (LFBE). The acoustic features may be used by a first, wakeword-detection model to detect the wakeword; the output of this model may be further processed using a softmax function, to smooth it, and to detect spikes. The same acoustic features may be also be used by a second, acoustic-event-detection model to detect the acoustic event; the output of this model may be further processed using a sigmoid function and a classifier. Another model may be used to extract additional features from the LFBE data; these additional features may be used by the other models.

22 Claims, 19 Drawing Sheets

(56) References Cited

U.S. PATENT DOCUMENTS

| | | | |
|---|---|---|---|
| 10,585,989 B1* | 3/2020 | Ahmed | G06N 3/08 |
| 10,755,709 B1* | 8/2020 | Mamkina | G10L 15/18 |
| 2005/0273334 A1* | 12/2005 | Schleifer | G10L 15/20 |
| | | | 704/255 |
| 2006/0028337 A1* | 2/2006 | Li | G08C 17/00 |
| | | | 340/539.1 |
| 2008/0243506 A1* | 10/2008 | Sakai | G10L 15/32 |
| | | | 704/256.4 |
| 2014/0114660 A1* | 4/2014 | Zhang | G10L 17/06 |
| | | | 704/240 |
| 2015/0127594 A1* | 5/2015 | Parada San Martin | |
| | | | G06N 3/0454 |
| | | | 706/16 |
| 2015/0154955 A1* | 6/2015 | Ma | G10L 15/08 |
| | | | 704/257 |
| 2015/0340032 A1* | 11/2015 | Gruenstein | G06N 3/0472 |
| | | | 704/232 |
| 2016/0092766 A1* | 3/2016 | Sainath | G06N 3/0481 |
| | | | 706/20 |
| 2017/0270919 A1* | 9/2017 | Parthasarathi | G10L 15/02 |
| 2017/0372694 A1* | 12/2017 | Ushio | G06N 3/084 |
| 2018/0046614 A1* | 2/2018 | Ushio | G06N 3/0454 |
| 2018/0158453 A1* | 6/2018 | Campbell | G06F 21/6218 |
| 2019/0013008 A1* | 1/2019 | Kunitake | G10L 15/22 |
| 2020/0066297 A1* | 2/2020 | Liu | G06N 3/0445 |
| 2020/0175987 A1* | 6/2020 | Thomson | G10L 15/187 |
| 2020/0176014 A1* | 6/2020 | Zhang | G10L 15/16 |
| 2020/0251100 A1* | 8/2020 | Tan | G06F 16/90332 |
| 2020/0286465 A1* | 9/2020 | Wang | G10L 15/08 |
| 2020/0388273 A1* | 12/2020 | Fu | G10L 15/18 |

* cited by examiner

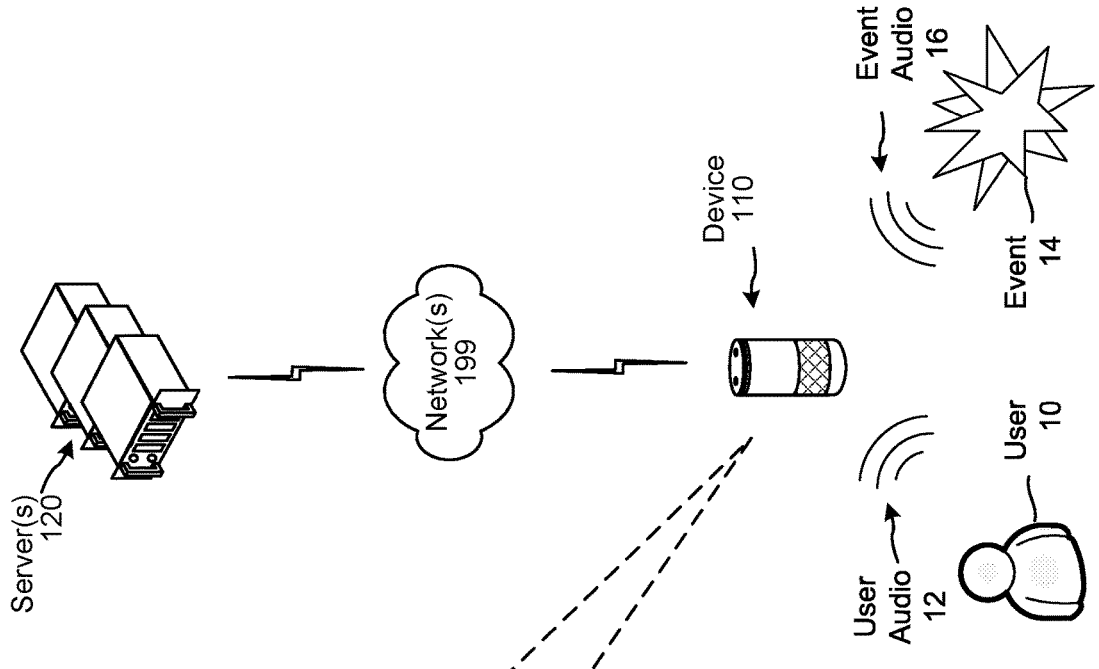
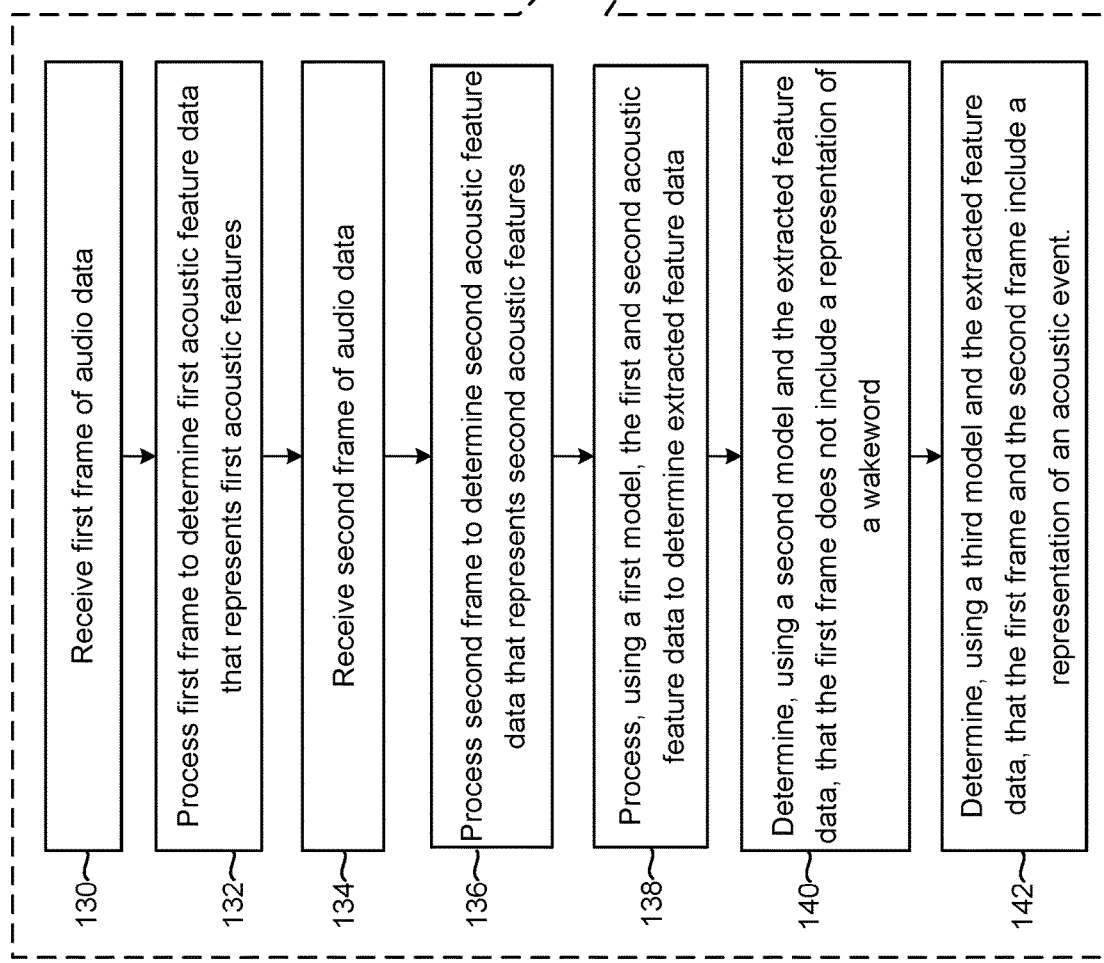
FIG. 1A

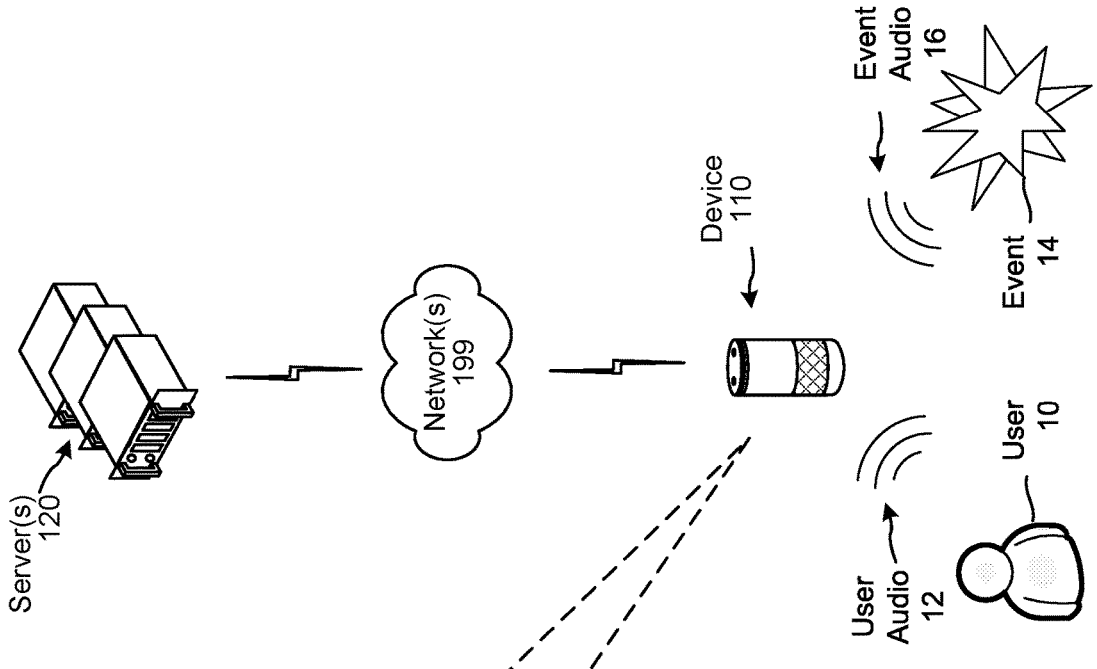
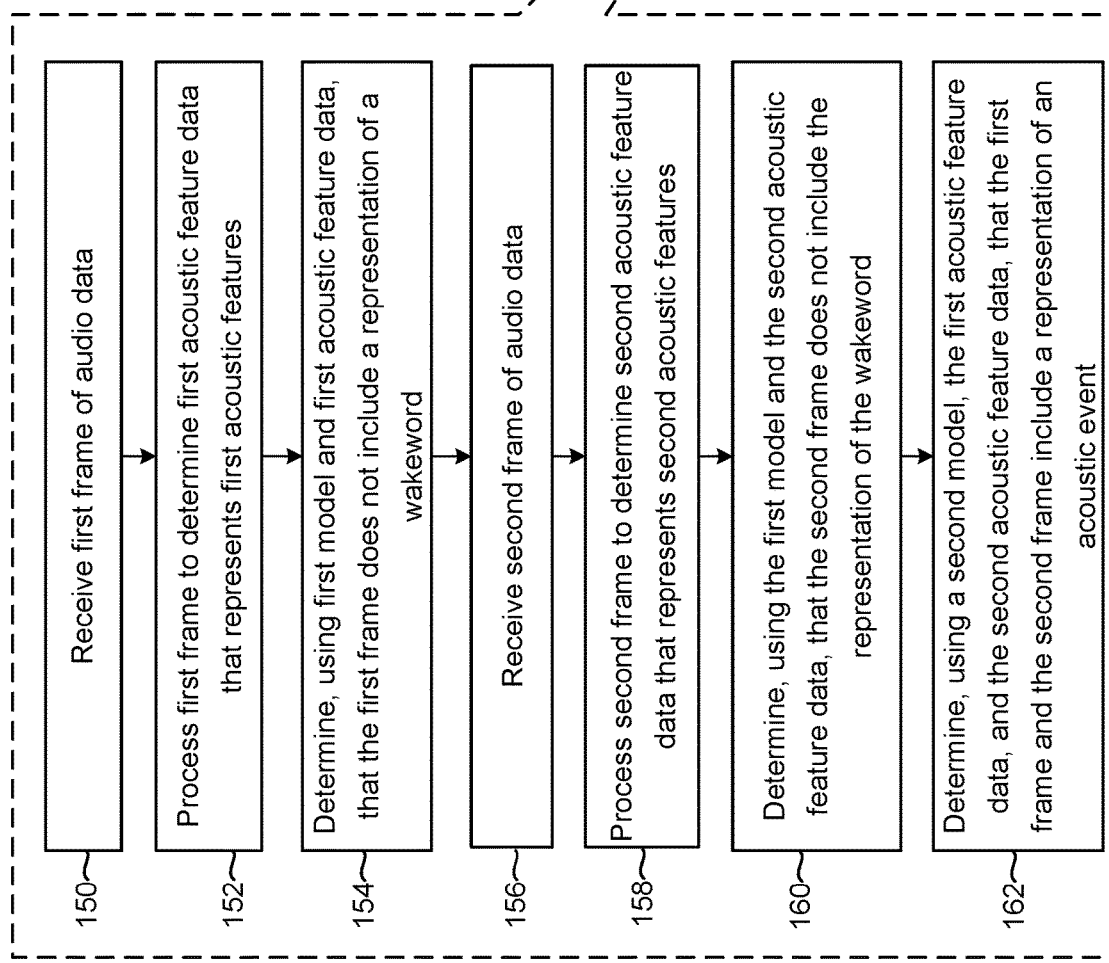

WAKEWORD AND ACOUSTIC EVENT DETECTION

CROSS REFERENCE TO RELATED APPLICATION

This application is a continuation of, and claims priority to, U.S. Non-Provisional patent application Ser. No. 16/452,964, filed on Jun. 26, 2019, and entitled "WAKEWORD AND ACOUSTIC EVENT DETECTION," in the names of Ming Sun, et al. The contents of which is expressly incorporated herein by reference in its entirety.

BACKGROUND

Devices may be configured to use microphones to capture audio and to convert the audio to audio data. Certain techniques may be employed by these devices and/or other systems to process the audio data to perform various operations.

BRIEF DESCRIPTION OF DRAWINGS

For a more complete understanding of the present disclosure, reference is now made to the following description taken in conjunction with the accompanying drawings.

FIG. 1A illustrates a system for detecting wakewords and acoustic events using a shared neural network according to embodiments of the present disclosure.

FIG. 1B illustrates a system for detecting wakewords and acoustic events using shared log-filterbank energy (LFBE) features according to embodiments of the present disclosure.

DETAILED DESCRIPTION

Figure 2:
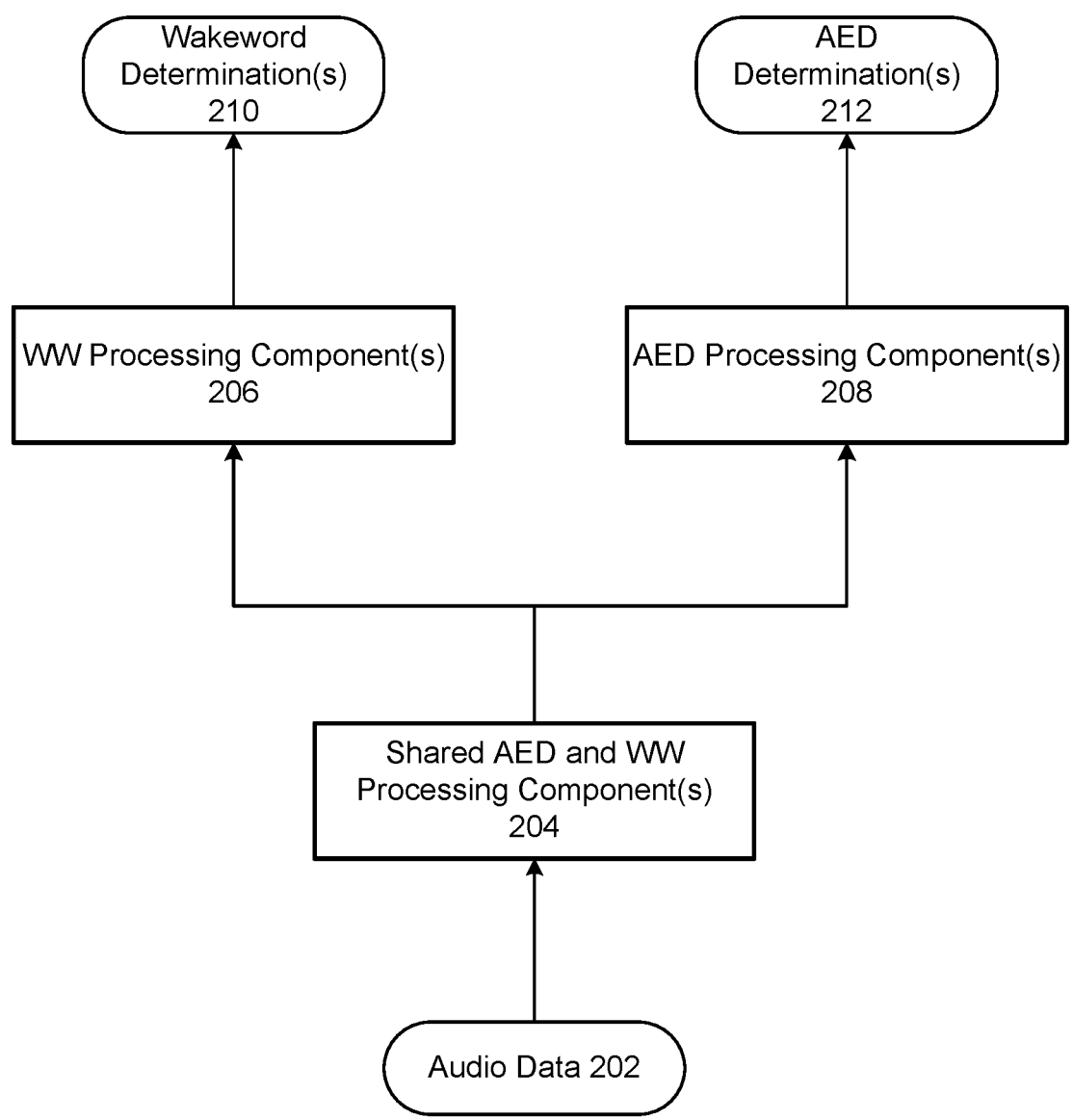
FIG. 2 illustrates a system for detecting wakewords and acoustic events according to embodiments of the present disclosure.

Speech-recognition systems allow users to interact with computing devices using their voices. Such systems employ techniques to identify the words spoken by a user based on the various qualities of received audio. Automatic-speech recognition (ASR) combined with natural-language understanding (NLU) processing techniques enable speech-based user control of a computing device; the device may, for example, perform tasks based on the user's spoken commands. The combination of speech recognition and natural-language understanding processing techniques is referred to herein as speech processing. Speech processing may also involve converting a user's speech into text data which may then be provided to various text-based software applications. Speech processing may be used by computers, hand-held devices, telephone computer systems, kiosks, and a wide variety of other devices to improve human-computer interactions.

Continually performing ASR and NLU to recognize and understand a full set of words and sentences may, however, be computationally expensive. Significant computing resources may be needed to process ASR and NLU fast enough to provide responses to a user query within a reasonable time frame. Because of this need, a distributed computing environment may be used when performing speech processing. An example distributed environment may involve a local device having one or more microphones configured to capture sounds from a user speaking and to convert those sounds into audio data. The audio data may then be sent to a downstream remote device for further processing, to complete the transformation of the audio signal into an ultimate command. The command may then be executed by a combination of remote and local devices depending on the command itself.

Local devices of speech-processing systems may therefore monitor audio to recognize a particular word or phrase—referred to herein as a "wakeword" (even if it includes more than a single word)—and sends audio data to a remote system (or otherwise further processes the audio data) only if and when the wakeword is detected. The local device may, for example, continually listen for the wakeword (WW) and may disregard any audio detected that does not include the wakeword. Typically, systems are configured to detect a wakeword and then process any subsequent audio following the wakeword (and, in some embodiments, a fixed, but short amount of pre-wakeword audio) to detect any commands in the subsequent audio. As an example, a wakeword may include a name by which a user refers to a device. For example, if the wakeword is "Alexa," a user may command a local voice-controlled device to play music by saying "Alexa, play some music." The device, recognizing the wakeword "Alexa," processes the subsequent audio (in this example, "play some music") to determine a command and may send data corresponding to that subsequent audio (as well as potentially to the wakeword and some buffered audio prior to the wakeword) to a remote device (and/or maintain it locally) to perform speech processing on that audio to determine the command for execution and potentially determine a corresponding service to fulfill the command. Provided services may include performing actions or activities, rendering media, obtaining and/or providing information, providing information via generated or synthesized speech via a local device, and/or initiating Internet-based services on behalf of the user.

Instead of or in addition to processing audio to detect a wakeword (using a first, wakeword-detection system, described in greater detail below), a local device may also process the audio (using a second, acoustic-event detection system, also described in greater detail below) to detect an acoustic event. An acoustic event is an audio event of interest to the user and/or system that may indicate that further audio or other processing is needed or desired. Examples of acoustic events include a user being disposed proximate a local device (e.g., a user being "present"), a user speaking an utterance, a baby crying, a glass shattering, or a car honking. The wakeword-detection and acoustic-event detection systems may process the audio differently; the wakeword-detection system may, for example, processes a one-second window of audio data to determine if syllables of an utterance represented in the window match syllables of a wakeword; the acoustic-event detection system may, for example, process a ten-second window of audio data to determine if a sound represented in the window matches a representation of an acoustic event. As part of determining that the audio includes the representation of the wakeword and/or acoustic event, the models may determine that part of the audio—e.g., one or more frames of audio data—include at least part of a representation of the wakeword and/or acoustic event.

The ability for a computing system to detect an acoustic event may have a variety of uses including security, home automation, parenting notifications, or the like. Acoustic event detection (AED) may be particularly useful when other indicators (such as visual data) may be unavailable. AED may be performed by comparing input audio data to an audio signature corresponding to the acoustic event and, if there is a sufficient match between the signature and the input audio data, the system may determine that an acoustic event has occurred and take action accordingly.

The local device may use a first system to detect a wakeword and a second system to detect an acoustic event. For example, the first system may include a first model trained using machine learning (ML) to detect the wakeword and a second model trained using ML to detect one (or more) acoustic events. The models for wakeword detection and acoustic event detection may have different configurations and properties; a wakeword model may receive, as input, audio data corresponding to a relatively short period of time (e.g., 1 second) that corresponds to the time it takes to utter a typical wakeword. An AED model may receive, as input, audio data corresponding to a relatively longer period of time (e.g., 10 seconds) that corresponds to the time over which a typical event may occur. A wakeword model may not operate as desired if its input data corresponds to too long a time—e.g., it may simply have trouble "finding" the wakeword if it is also processing audio data corresponding to other words. Likewise, the AED model may not operate as desired if its input data corresponds to too short a time—e.g., a short input time may represent audio of only part of an event, and this part may not be distinguishable as the event.

This separation of the WW and AED models thus allows each model to receive and process inputs corresponding to different periods of time. These periods of time may be referred to as context windows; e.g., the context window of the WW model may be 1 second and the context window of the AED model may be 10 seconds. Use of separate WW and AED models, however, requires that a WW/AED detection system allocate system resources, including computer processing and computer memory, separately for each model. In addition to requiring these resources, use of separate WW and AED models requires a corresponding increase in power consumption.

The present disclosure relates to systems and methods for sharing one or more components and/or data between WW and AED models; this sharing reduces the need for system resources and thereby reduces power consumption. In some embodiments, acoustic feature vectors, such as a log-filter-bank energy (LFBE) data arraigned into LBFE vectors, are created once and then used by both models. The WW model, because it may use a shorter context window, may receive as input a relatively smaller number of acoustic feature vectors at a time, such as 80 LFBE vectors. The AED model, because it uses a longer context window, may receive as input a relatively larger number of acoustic feature vectors at a time, such as 1000 LFBE vectors. While the models wait for the acoustic feature vectors to be generated, the acoustic feature vectors may be stored in one or more buffers (e.g., computer memories configured to temporarily store the vectors).

In other embodiments, the WW and AED models may receive output from one or more neural-network models that process the acoustic feature vectors first. For example, one or more layers of a deep neural network (DNN) and/or convolutional neural network (CNN) may receive a number of acoustic feature vectors corresponding to a context window and extract features from the acoustic feature vectors. These extracted features may include higher-level audio properties, such as tone or pitch, or other properties determined by the ML training that do not necessarily map to real-world properties. The WW and AED models may then process the extracted features instead of the acoustic feature vectors. This processing of the extracted features may enable the WW and AED models to use a same-size context window and may reduce size, complexity, and/or training time of the models.

In some embodiments, the AED model uses a long short-term memory (LSTM) network to "listen" to input audio over its long context window—the recurrent nature of the LSTM network means that the AED model need not process each acoustic feature vector of its context window simultaneously, but may process the acoustic feature vectors individually or in subsets while the LSTM network "remembers" the processing of earlier subsets. Processing of the extracted features by the AED model means, however, that the context window of the AED network may be smaller, and the AED model may use a DNN or CNN in lieu of the LSTM. In other embodiments, the WW and AED models may be fully combined, and a softmax component may determine both when a wakeword is detected and when an acoustic event occurs.

Machine learning (ML) is a computing technique that allows computing systems to learn techniques for solving complex problems without needing an explicit algorithm for the computing system to follow. ML may use a trained model that consists of internally configured operations that can manipulate a particular type of input data to determine a desired result. Trained models are used in many computing tasks such as computer vision, speech processing, predictive analyses, and may also be used in acoustic event detection.

Trained models come in a variety of forms including include trained classifiers, support-vector machines (SVMs), neural networks (such as deep neural networks (DNNs), recurrent neural networks (RNNs), or convolutional neural networks (CNNs)) and others. As an example, a neural network typically includes an input layer, an output layer and one or more intermediate hidden layers where the input layer is configured to take in a certain kind of data and the output layer is configured to output the desired kind of data to result from the network and the hidden layer(s) perform a variety of functions to go from the input data to the output data.

Various techniques may be used to train ML models including back-propagation, statistical learning, supervised learning, semi-supervised learning, stochastic learning, or other such techniques. During supervised learning, a model may be configured to infer a function from labeled training data. Thus, a computing system may use training data in the form of training examples that provide examples of the kinds of input data the model will be configured to process at runtime, as well as an accompanying "ground truth" for each training example. The ground truth provides the correct response for the respective training example, thus providing a complete example that can be used to train the model. Other data that may be used to train a model may include training parameters such as error functions, weights, or other data that can be used to guide the training of a model.

FIG. 1A illustrates a system for detecting a wakeword in an utterance from a user 10 by processing user audio 12 and for detecting an event 14 by processing event audio 16 according to embodiments of the present disclosure. As described below, the WW model and AED model that perform the processing share the output of a feature-extraction model, which may include one or more neural-network layers. Although the steps of FIG. 1A, and other figures below, are discussed in a particular order, unless expressly stated otherwise the order of operations may be changed and still be within the scope of the present disclosure. Further, as illustrated in FIG. 1A, the steps may be performed by a combination of one or more device(s) 110 and one or more server(s) 120, which may be connected over a network 199. In various embodiments, the device 110 receives (130) a first frame of audio data and processes (132) the first frame to determine a first acoustic feature vector that represents first acoustic features corresponding to the first frame. The device 110 receives (134) a second frame of audio data and processes (136) the second frame to determine a second acoustic feature vector that represents second acoustic features corresponding to the second frame. The device 110 processes, (138) using a first model, the first acoustic feature vector and the second acoustic feature vector to determine a third acoustic feature vector. The device 110 determines (140), using a second model and the third acoustic feature vector, that the first frame does not include a representation of a wakeword, and the device 110 determines, (142) using a third model and the third acoustic feature vector, that the first frame and the second frame include a representation of an acoustic event. As can be appreciated, in other scenarios the device may determine that a wakeword was detected and/or that an acoustic event of interest did not occur, etc.

FIG. 1B also illustrates a system for performing wakeword and acoustic-event detection according to embodiments of the present disclosure. As described below, the WW model and AED model may share input data, such as acoustic feature data comprising LFBE data. In various embodiments, the device 110 receives (150) a first frame of audio data and processes (152) it to determine first acoustic feature data that represents first acoustic features corresponding to the first frame. The device 110 determines (154), using a first model and the first acoustic feature data, that the first frame does not include a representation of a wakeword. The device 110 similarly receives (156) a second frame of audio data and processes (158) it to determine second acoustic feature data that represents second acoustic features corresponding to the second frame. The device 110 also determines (160), using the first model and the second acoustic feature data, that the second frame does not include the representation of a wakeword. The device 110 then determines (162), using a second model, the first acoustic feature data, and the second acoustic feature data, that the first frame and the second frame include a representation of an acoustic event. As can be appreciated, in other scenarios the device may determine that a wakeword was detected and/or that an acoustic event of interest did not occur, etc.

FIG. 2 illustrates a system for determining if audio data includes a representation of a wakeword and/or an acoustic event in accordance with the present disclosure. A shared AED and wakeword processing component 204 receives audio data 202. The audio data 202 may be received from a microphone or microphone array; the audio data 202 may be a digital representation of an analog audio signal and may be sampled at, for example, 256 kHz. The shared AED and wakeword processing component 204 may include a component that processes the audio data 202 to determine acoustic feature data, which may be one or more acoustic feature vectors such as LFBE vectors, which may then be used by both a wakeword processing component 206 and by an AED processing component 208. The shared AED and wakeword processing component 204 may instead or in addition include a component that processes acoustic feature data determined from the audio data 202; this component may determine extracted feature data that represents higher-level features of the audio data 202, such as tone, pitch, or intonation. The wakeword processing component 206 may then make one or more wakeword determinations 210 which may include indications that the audio data 202 includes a representation of one or more wakewords. The AED processing component 208 may make one or more AED determinations 212 which may include indications that the audio data 202 includes a representation of one or more acoustic events.

Generation of the acoustic feature data is described in greater detail below with reference to FIGS. 3 and 4. The wakeword-processing component(s) 206 are described in greater detail below with reference to FIG. 5. The AED processing component(s) are described in greater detail with reference to FIG. 7. The shared AED and WW processing component(s) 204 are described in greater detail with reference to FIGS. 9-13.

Figure 3:
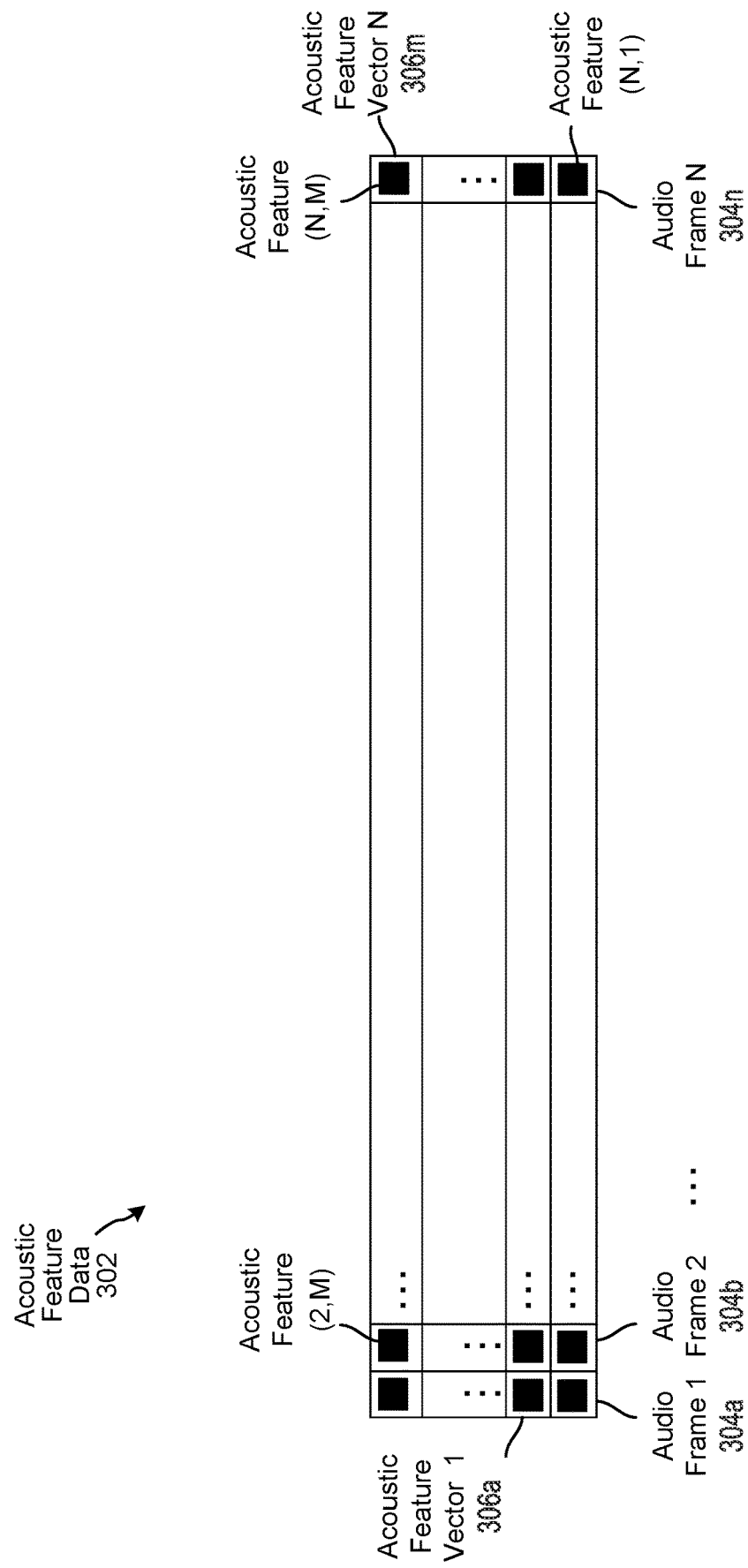
FIG. 3 illustrates acoustic feature data including acoustic feature vectors according to embodiments of the present disclosure.

FIG. 3 illustrates an example of acoustic feature data 302. The acoustic feature data 302 may be organized as a two-dimensional matrix of acoustic feature vectors 306. The x axis of the matrix corresponds to a plurality of audio frames 304. Each audio frame may include audio data representing, for example, approximately 10 milliseconds of audio. As mentioned above, acoustic feature data 302 for input to a WW detection model may correspond to approximately 1 second of audio, while acoustic feature data 302 for input to an AED detection model, as described above, may correspond to approximately 10 seconds of audio. Any number of audio frames 304 is, however, within the scope of the present disclosure.

For each audio frame 304, an acoustic feature vector 306 is determined, as described in greater detail below. The acoustic feature vector 306 describes one or more acoustic features of the audio represented by each frame, such as the audio's estimated energy level as represented by one or more LFBE or MFCC values. The acoustic feature data 302 may include N frames of audio data, and each of the N frames may be associated with M acoustic features. Each of the M acoustic features may represent an estimated energy level of each of M frequency ranges of the audio represented by the audio frame. For the wakeword processing component 206, for example, the acoustic feature data 302 may include 80 frames and 20 acoustic features for each frame; for the AED processing component 208, the acoustic feature data may include 1000 frames and 20 acoustic features for each frame.

Figure 4:
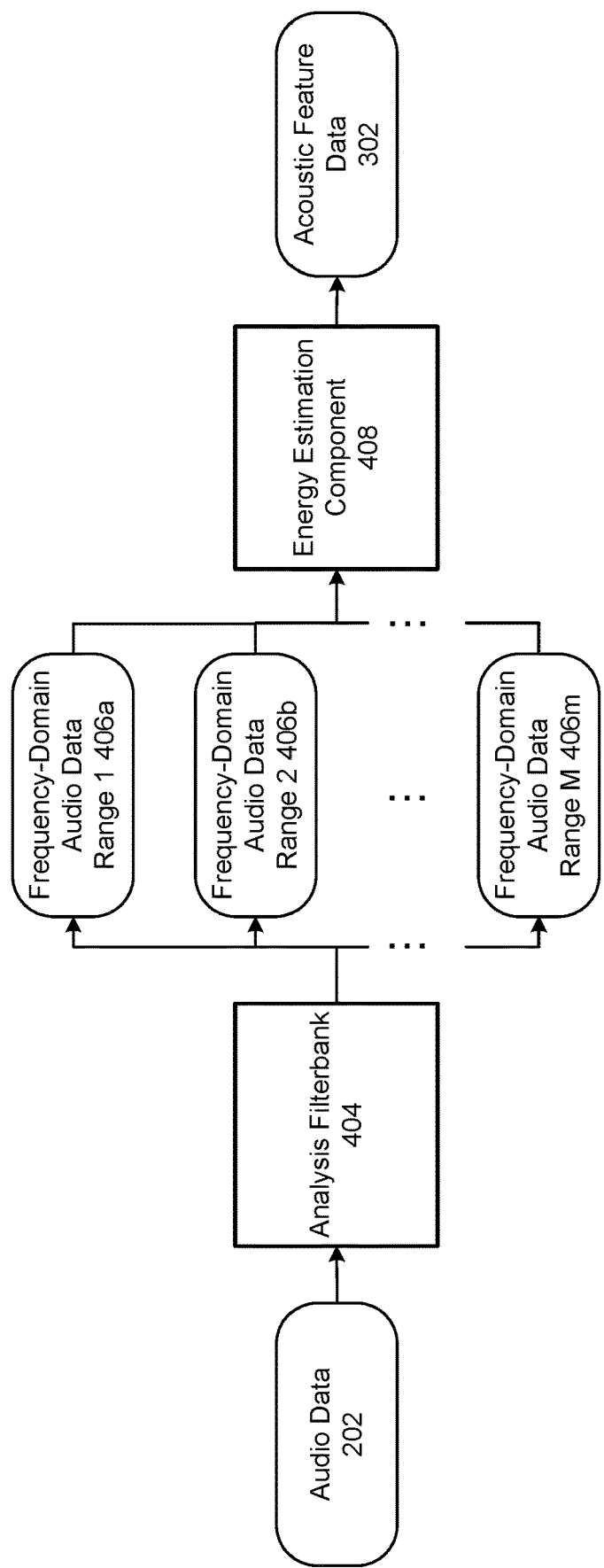
FIGS. 4 illustrates a system for creating acoustic feature data according to embodiments of the present disclosure.

Referring to FIG. 4, an acoustic feature-extraction component may process the audio data 202 to create acoustic feature data 302, which may include one or more acoustic-feature vectors such as LFBE vectors. Other types of feature vectors may be similarly created and used; for example, the feature vectors may include Mel-frequency cepstrum coefficients (MFCCs).

An analysis filterbank 404 receives the audio data 202, which may represent one or more frames audio data. The audio data 202 may be a digital representation of an analog audio signal, which may represent an utterance and/or an acoustic event. The analysis filterbank 404 may include hardware, software, and/or firmware for converting the time-domain audio data of the audio data 202 into frequency-domain audio data 406. This conversion may be performed by implementing a Fourier transform algorithm, such as a fast Fourier transform (FFT) or discrete-time Fourier transform (DTFT). The analysis filterbank 404 may further include two or more filters for separating the frequency range of the resultant frequency-domain audio data into two or more frequency ranges or bins. For example, the analysis filterbank 404 may separate a frequency range of 20 Hz-20 kHz into 20 bins. The analysis filterbank 404 may thus output M frequency ranges 406, wherein M may equal 20.

An energy estimation component 408 may receive as input the frequency data 406, process it to determine one or more values that represent an estimated energy of the frequency data 406, and output corresponding acoustic feature data 302 for each audio frame. If M acoustic features are extracted, the acoustic feature data 302 may include one or more acoustic feature vectors of size M. The energy estimation component 408 may include one or more filters that, given the frequency data 406, determine one or more magnitudes of audio energy for each bin of frequency data 406. These magnitudes may be represented by one or more integer and/or fixed-point values of the acoustic feature vector 306. The energy estimation component 408 may determine the magnitudes by, for example, averaging the frequency data 406 or performing a root-mean-square operation on the frequency data 406. The energy estimation component 408 may, prior to processing the frequency data 406, convert the frequency data 406 from a first frequency format (e.g., Hertz) to a second frequency format (e.g., Mel). The energy estimation component 408 may then perform a logarithm operation to determine the log-filterbank energies (LFBEs) of each bin. The acoustic feature data 302 may thus include one or more LFBE vectors. In other embodiments, the energy estimation component 408 may perform a linear cosine transform on the logarithm of the frequency data 406 to determine Mel-frequency cepstrum coefficients (MFCC), which may instead or in addition be represented by the acoustic feature data 302. The dimension of each acoustic feature vector of the acoustic feature data 302 (which may be 20) may correspond to the number M of frequency bins (which may be 20).

Figure 5:
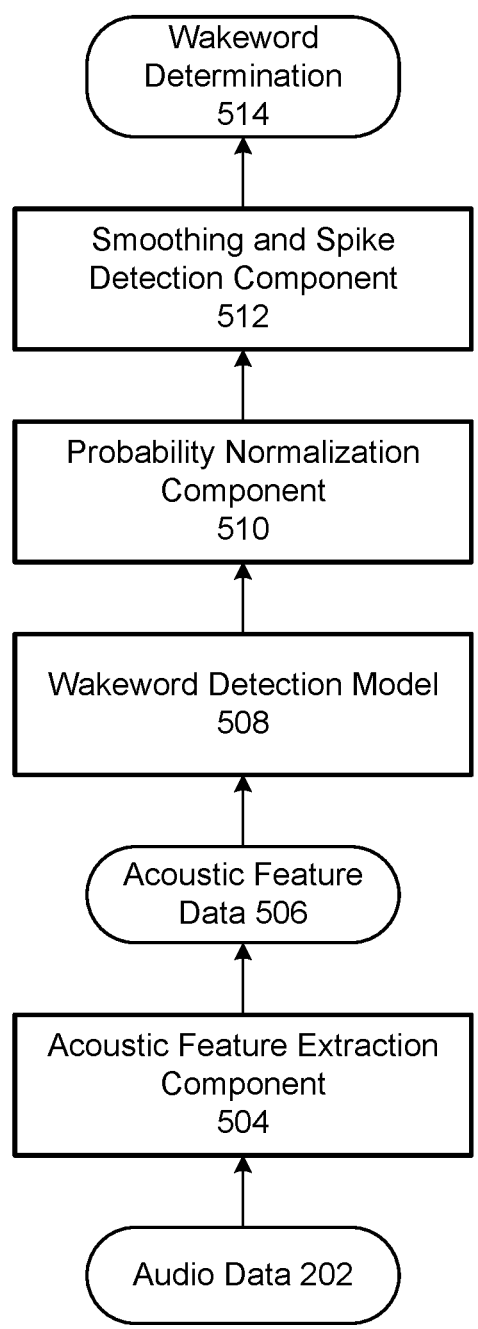
FIG. 5 illustrates a system for detecting wakewords according to embodiments of the present disclosure.

Referring to FIG. 5, as described above, an acoustic-feature extraction component 504 may process audio data 202 to determine acoustic feature data 506, which may include acoustic feature vectors that represent LFBE and/or MFCC data. A wakeword-detection model 508 may process the acoustic feature data 506 to determine one or more probabilities that the audio data 202 includes a representation of one or more wakewords. The wakeword-detection model 508 is described in greater detail below. A probability normalization component 510 may be used to receive two or more probabilities and normalize them with respect to each other. For example, in a system using two wakewords, a high probability of detection of one wakeword in the audio data 502 implies a low probability of detection of the other wakeword being in the audio data 202. In some embodiments, the probability normalization component 510 implements a "softmax" function, in which the probabilities are scaled such that they all lie between 0 and 1 and that their sum is also 1. The probability normalization component 510 may not be needed in a system that detects only one wakeword.

A smoothing and spike-detection component 512 receives the output of the probability normalization component 510, smooths the output, and detects spikes in the output. Smoothing refers to a process of averaging the output of the probability normalization component 510 across a number of frames; the average may be computed at every frames or at every few frames. In some embodiments, the average is taken every 50 frames. The entire average may be computed for each group of frames; in other embodiments, a running average is maintained and updated every frame or every few frames. Computing the running average may include removing, from the data used to compute the average, the output of the probability normalization component 510 corresponding to an oldest frame (e.g., the $51^{st}$ frame if the average is taken over 50 frames), adding, to the data used to compute the average, the output of the probability normalization component 510 corresponding to a newest frame (e.g., the $1^{st}$ frame if the average is taken over 50 frames), and re-computing the average. The outputs of the probability normalization component 510 may be weighted prior to taking the average to, for example, emphasize newer frames over older frames. A separate average may be computed for each wakeword.

The smoothing and spike-detection component 512 may then simply compare the average to a threshold, and the wakeword determination 514 may indicate that a wakeword is present in the audio data 202 (and which wakeword) if that corresponding wakeword's average is greater than the threshold. The smoothing and spike-detection component 512 may instead determine not just that the average is greater than the threshold, but also that the average is greater than the threshold for a certain minimum number of frames. This spike detection ensures that an erroneous single-frame increase of the average above the threshold does not trigger detection of the wakeword. The minimum with of the spike may be 40 frames (e.g., at least half of the time of the utterance of the wakeword).

Figure 6A:
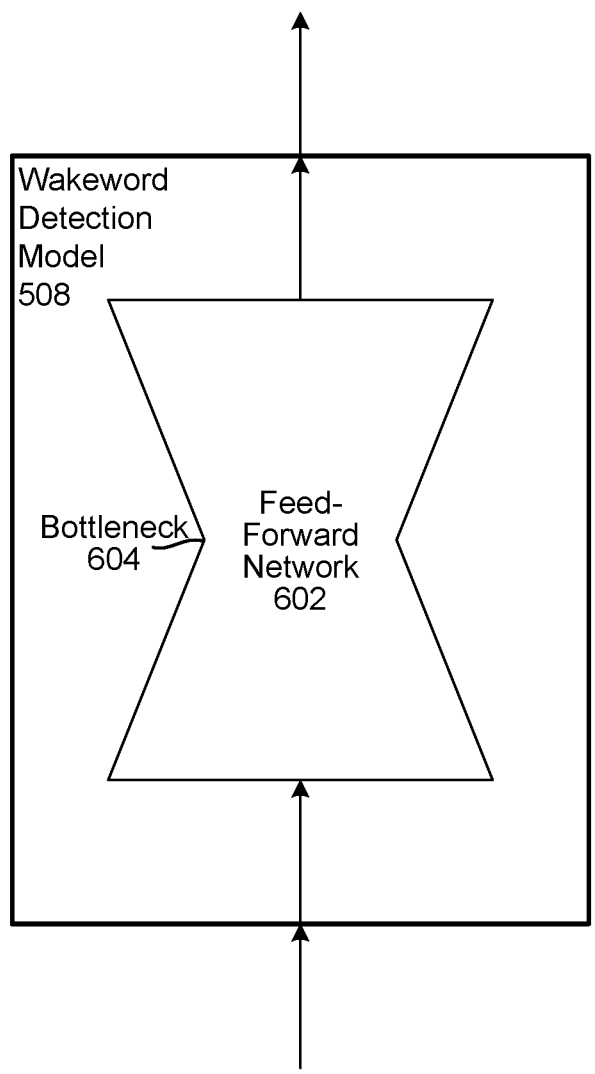
FIGS. 6A and 6B illustrate models for determining wakeword probabilities according to embodiments of the present disclosure.
Figure 6B:
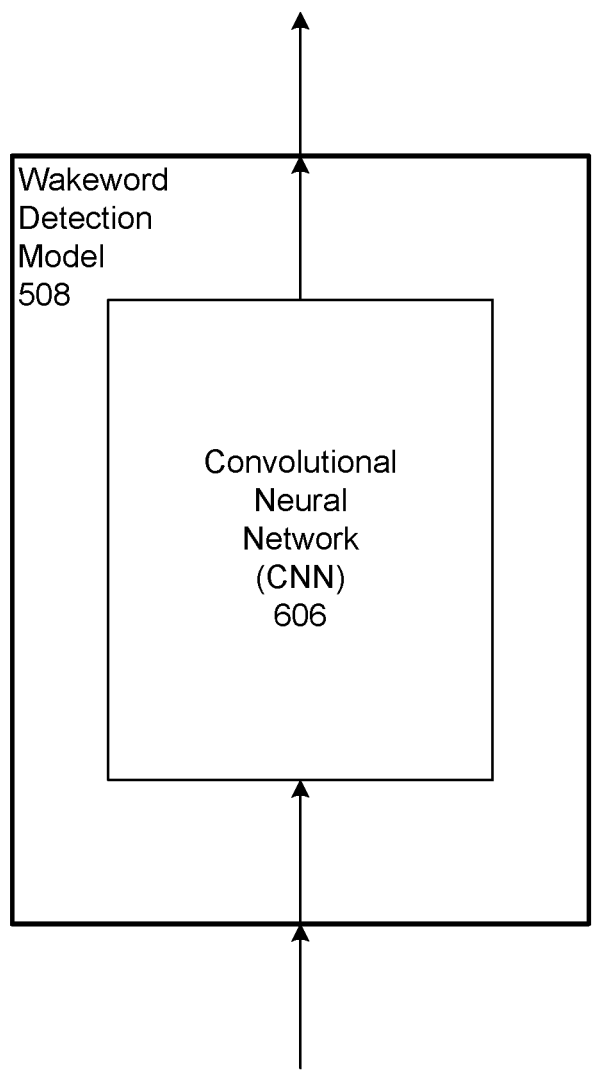

FIGS. 6A and 6B illustrate embodiments of the wakeword-detection model 508. Referring first to FIG. 6A, a feed-forward network 602 receives the acoustic-feature data 506 and processes it to create one or more probabilities that one or more wakewords are represented in the audio data 202. The feed-forward network 602 may include a bottleneck 604. A bottleneck refers to a network layer of the feed-forward network 602 that has fewer nodes than a preceding and/or ensuing layer. Referring to FIG. 6B, a CNN 606 may also be used to receive the acoustic feature data 506 and process it to create one or more probabilities that one or more wakewords are represented in the audio data 202. The wakeword-detection model 508 may thus be implemented using the feed-forward network 602, the CNN 606, or other network. The present disclosure is not limited to any particular type of network for the wakeword-detection model 508.

The feed-forward network 602 and/or CNN 606 may include a number of nodes arraigned in one or more layers. Each node may be a computational unit that has one or more weighted input connections, a transfer function that combines the inputs in some way, and an output connection. The CNN model 606 may perform a convolution operation using the acoustic feature data 506; the CNN model 606 may further perform a rectification function using, for example, a rectified linear unit (ReLu) to increase non-linearity of the CNN model 606, may perform a pooling operation to reduce or eliminate effects of variation in pronunciation of the wakeword, and/or may perform a flattening function to combine a matrix of values into a single vector.

As described above, the wakeword-detection model 508 may be trained using ML techniques and training data. The training data may include audio samples of utterances of the wakeword by different speakers and under different conditions. The training data may further include non-wakeword words and annotation data indicating which words are wakewords and which words are non-wakeword words. The wakeword-detection model 508 may be trained by processing the training data, evaluating the accuracy of its response against the annotation data, and updating the wakeword-detection model 508 via, for example, gradient descent. The wakeword-detection model 508 may be deemed trained when it is able to predict utterance of the wakeword in non-training data within a required accuracy.

The wakeword-detection model 508, however implemented, may thus receive the acoustic feature data 506 and, based thereon, determine a wakeword-detection probability, which may be one or more numbers indicating a likelihood that the LBFE data 506 represents the wakeword. The wakeword detection probability may be, for example, a number that ranges from 0.0 to 1.0, wherein 0.0 represents a 0% chance that the acoustic feature data 506 represents the wakeword, 1.0 represents a 100% chance that the acoustic feature data 506 represents the wakeword, and numbers between 0.0 and 1.0 represent varying degrees of likelihood that the acoustic feature data 506 represents the wakeword. A value of 0.75, for example, may correspond to 75% confidence in the acoustic feature data 506 including a representation of the wakeword. The wakeword probability may further include a confidence value over time and may indicate at which times in the acoustic feature data 206 that the wakeword is more or less likely to be represented.

Figure 7:
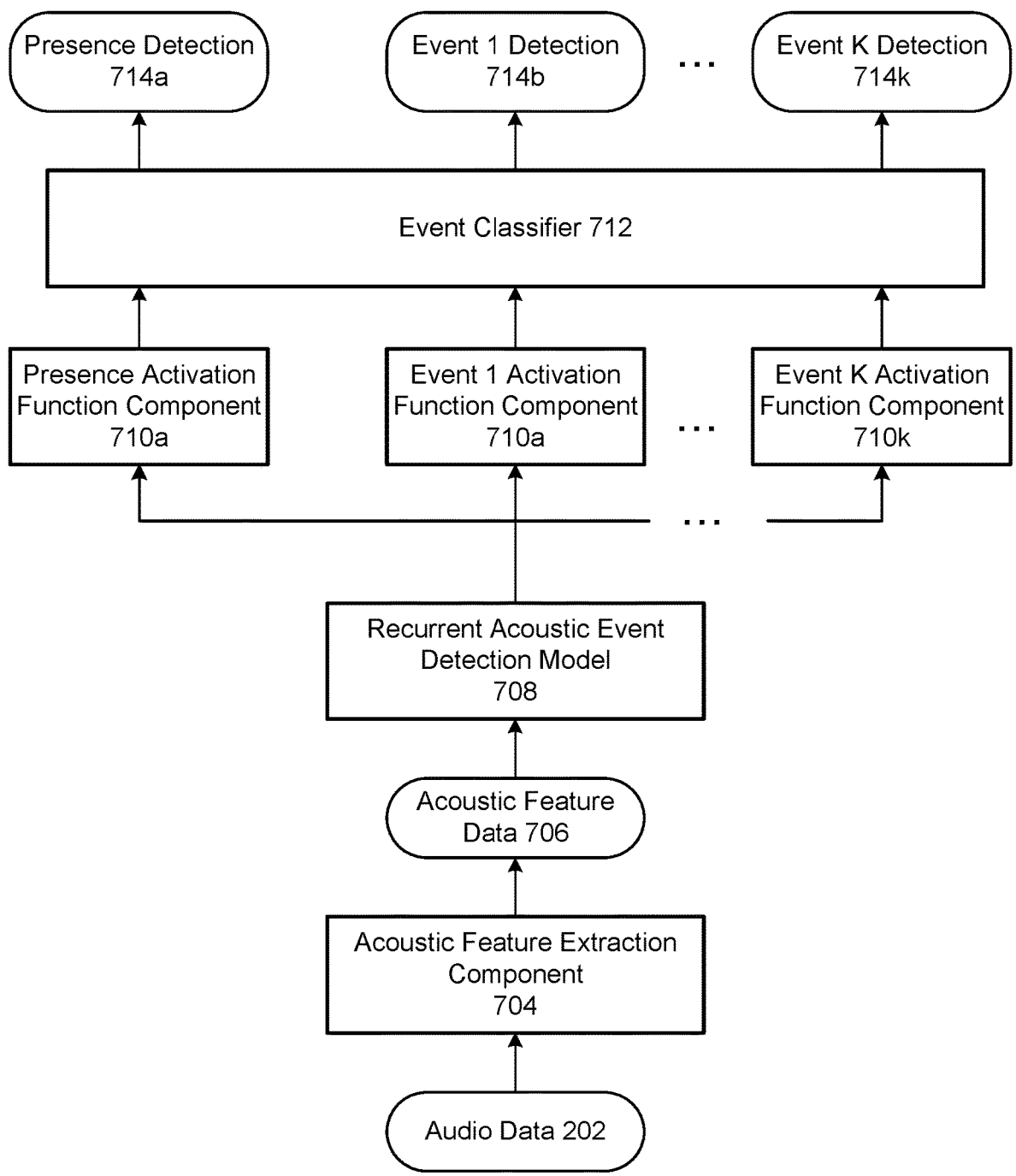
FIG. 7 illustrates a system for detecting acoustic events according to embodiments of the present disclosure.

FIG. 7 illustrates components 208 for performing AED in accordance with embodiments of the present disclosure. Like the wakeword-detection system discussed above, the AED system may receive audio data 202 from a microphone or microphone array; this audio data 202 may also be a digital representation of an analog audio signal and may be sampled at, for example, 256 kHz. An acoustic feature-extraction component 704 may process this audio data 202 to create acoustic feature data 706, which may include one or more LFBE and/or MFCC vectors. As mentioned above, the acoustic feature-extraction component 704 may differ from the similar component discussed with reference to FIG. 5 at least because the AED system may require a context window greater in size that that of the WW detection system. For example, the WW acoustic-feature data 506 may correspond to one second of audio data 202, while the AED acoustic-feature data 706 may correspond to ten seconds of audio data 402.

A recurrent AED model 708 may process the acoustic-feature data 706 to determine one or more probabilities that the audio data 202 includes one or more representations of one or more acoustic events. The recurrent AED model 708 may include a number of nodes arraigned in one or more layers. Each node may be a computational unit that has one or more weighted input connections, a transfer function that combines the inputs in some way, and an output connection. The recurrent AED model 708 may include one or more recurrent nodes, such as LSTM nodes, or other recurrent nodes, such as gated rectified unit (GRU) noes. For example, the recurrent AED model 708 may include 128 LSTM nodes; each LSTM node may receive one feature vector of the acoustic feature data 706 during each frame. For next frames, the recurrent AED model 708 may receive different sets of 128 feature vectors (which may have one or more feature vectors in common with previously-received sets of feature vectors—e.g., the sets may overlap). The recurrent AED model 708 may periodically reset every, for example, 10 seconds. The model 708 may be reset when a time of running the model (e.g., a span of time spent processing audio data) is greater than a threshold time. Resetting of the recurrent AED model 708 may ensure that the recurrent AED model 708 does not deviate from the state to which it had been trained. Resetting the recurrent AED model 708 may include reading values for nodes of the model—e.g., weights—from a computer memory and writing the values to the recurrent AED model 708.

As described above, the recurrent AED model 708 may be trained using ML techniques and training data. The training data may include audio samples of acoustic events under different conditions. The training data may further include representations of other events and annotation data indicating which events are of interest and which events are not of interest. The recurrent AED model 708 may be trained by processing the training data, evaluating the accuracy of its response against the annotation data, and updating the recurrent AED model 708 via, for example, gradient descent. The recurrent AED model 708 may be deemed trained when it is able to predict occurrence of acoustic events of interest in non-training data within a required accuracy.

The recurrent AED model 708, however implemented, may thus receive the acoustic-feature data 706 and, based thereon, determine an AED probability, which may be one or more numbers indicating a likelihood that the acoustic-feature data 706 represents the acoustic event. The AED probability may be, for example, a number that ranges from 0.0 to 1.0, wherein 0.0 represents a 0% chance that the acoustic-feature data 706 represents the acoustic event, 1.0 represents a 100% chance that the acoustic-feature data 706 represents the acoustic event, and numbers between 0.0 and 1.0 represent varying degrees of likelihood that the acoustic-feature data 706 represents the acoustic event. A value of 0.75, for example, may correspond to 75% confidence in the acoustic-feature data 706 including a representation of the acoustic event. The AED probability may further include a confidence value over time and may indicate at which times in the acoustic-feature data 706 that the acoustic event is more or less likely to be represented.

A number of activation function components 710—one for each acoustic event—may be used to apply an activation function to the probability of occurrence of that event output by the recurrent AED model 708. The activation function may transform the probability data such that probabilities near 50% are increased or decreased based on how far away from 50% they lie; probabilities closer to 0% or 100% may be affected less or even not at all. The activation function thus provides a mechanism to transform a broad spectrum of probabilities—which may be evenly distributed between 0% and 100%—into a binary distribution of probabilities, in which most probabilities lie closer to either 0% or 100%, which may aid classification of the probabilities as to either indicating an acoustic event or not indicating an acoustic event by an event classifier 712. In some embodiments, the activation function is a sigmoid function.

The event classifier 712 may be a classifier trained to distinguish between different acoustic events and other sounds. Examples of trained classifiers include support-vector machines (SVMs), neural networks, decision trees, AdaBoost (short for "Adaptive Boosting") combined with decision trees, and random forests. For example, a SVM is a supervised learning model with associated learning algorithms that analyze data and recognize patterns in the data and may be used for classification and regression analysis. Given a set of training examples, each marked as belonging to one of two categories (e.g., acoustic event vs. non-acoustic event), an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

The event classifier 712 may output one or more event detection outputs 714, each of which may indicate a yes/no decision as to whether an associated acoustic event has occurred. As mentioned above, one such event may be presence 714a, which indicates that at least one person is proximate the device 110.

Figure 8:
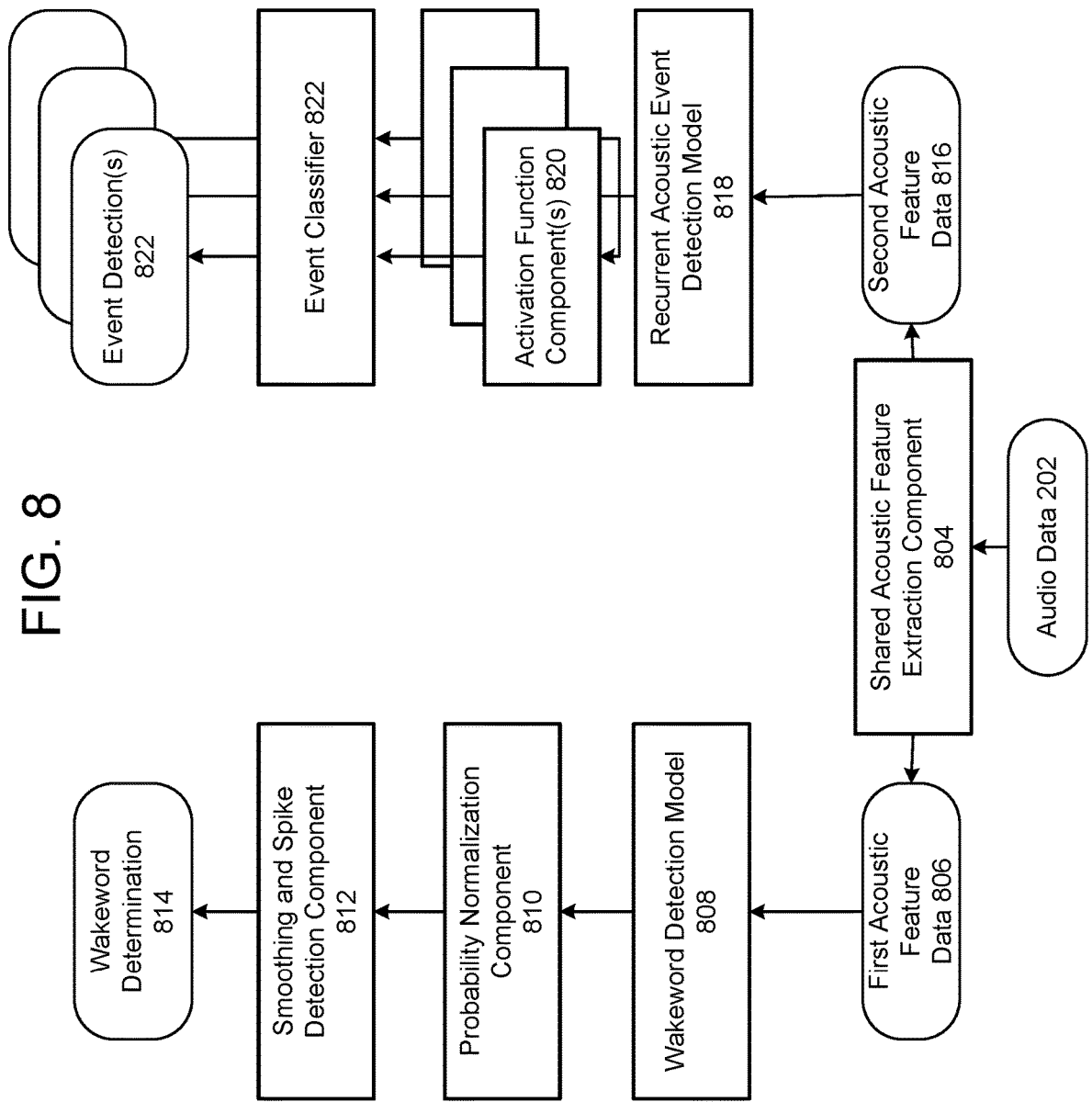
FIG. 8 illustrates a system for detecting acoustic events and wakewords using shared acoustic feature data according to embodiments of the present disclosure.

FIG. 8 illustrates a system for detecting acoustic events and wakewords using shared LFBE features according to embodiments of the present disclosure. A shared acoustic feature extraction component 804 receives audio data 202 and generates first LFBE data 606 and second LFBE data 616. The shared acoustic feature extraction component 804 and its output data are described in greater detail below with reference to FIGS. 9A and 9B. As described above, however, the first acoustic feature data 806 may be smaller (corresponding to approximately 80 frames of audio data) than the second acoustic feature data 816 (corresponding to approximately 1000 frames of audio data).

The first acoustic feature data 806 may be processed by a wakeword-detection model 808, which may be similar to the wakeword-detection model 508 discussed above with reference to FIG. 5. The wakeword-detection model 808 may, however, differ from the wakeword-detection model 508— even when trained using identical training data—in that the wakeword-detection model 808 may have different values for the weights given to each of its nodes. Similarly, the probability normalization component 810 may be analogous to the probability normalization component 510 and may also implement a softmax function, but may differ in the particular values assigned. A smoothing and spike-detection component 812 may smooth the output of the probability normalization component 810, as described above, to generate a wakeword determination 814.

As described above, an AED system may use the same acoustic feature data generated by the shared acoustic feature extraction component 804. The second acoustic feature data 816 may be processed by an AED model 818, which may be similar to the AED model 708 discussed above with reference to FIG. 7. The AED model 818 may, however, differ from the AED model 708—even when trained using identical training data—in that the AED model 818 may have different values for the weights given to each of its nodes. Similarly, the activation function component 810 may be analogous to the activation function components 710 and may also implement a sigmoid function, but may differ in the particular values assigned. An event classifier 822 may, like the event classifier 712 of FIG. 7, classify the outputs of the activation-function components 820 as yes/no detections 822 of their respective acoustic events.

Figure 9A:
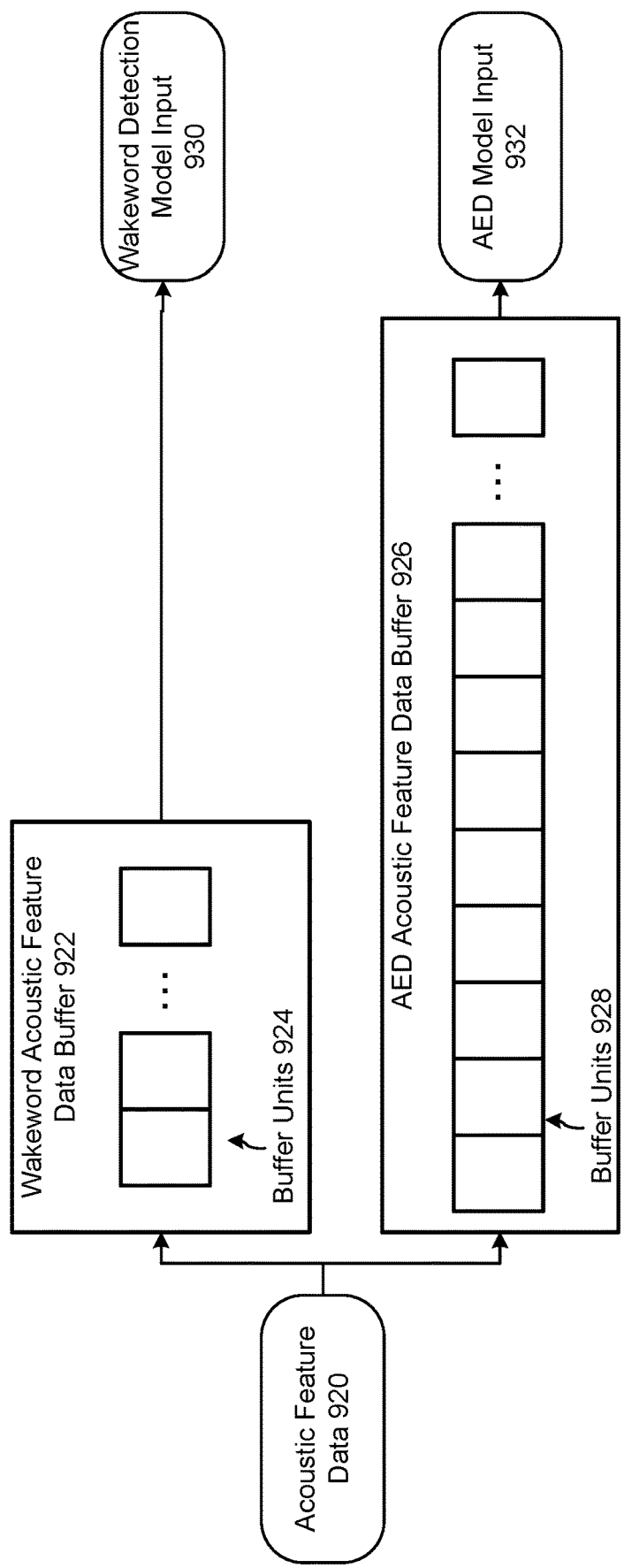
FIGS. 9A and 9B illustrate systems for processing acoustic feature data according to embodiments of the present disclosure.

As described above, the wakeword-detection model 508 may receive, as input, a relatively smaller number of acoustic feature vectors (e.g., 80), while the AED model 808 may receive, as input, a relatively higher number of acoustic feature vectors (e.g., 1000). As shown in FIG. 9A, a wakeword acoustic-feature data buffer 922 may store a relatively smaller number of acoustic feature vectors, while an AED acoustic feature data buffer 926 may store a relatively higher number of acoustic feature vectors. For every input of acoustic feature data 920 corresponding to a frame of audio data, the wakeword audio-feature data buffer 922 may output data to be input 930 for the wakeword-detection model 808 corresponding to this lower number, while the AED acoustic feature data buffer 926 may output input 923 for the AED model 818 corresponding to this higher number. In other words, for a given two (not necessarily adjacent) acoustic feature vectors, the wakeword-detection model 808 may perform two wakeword detections (one for each acoustic feature vector), while the AED model 818 may perform a single AED detection (using both acoustic feature vectors).

Figure 9B:
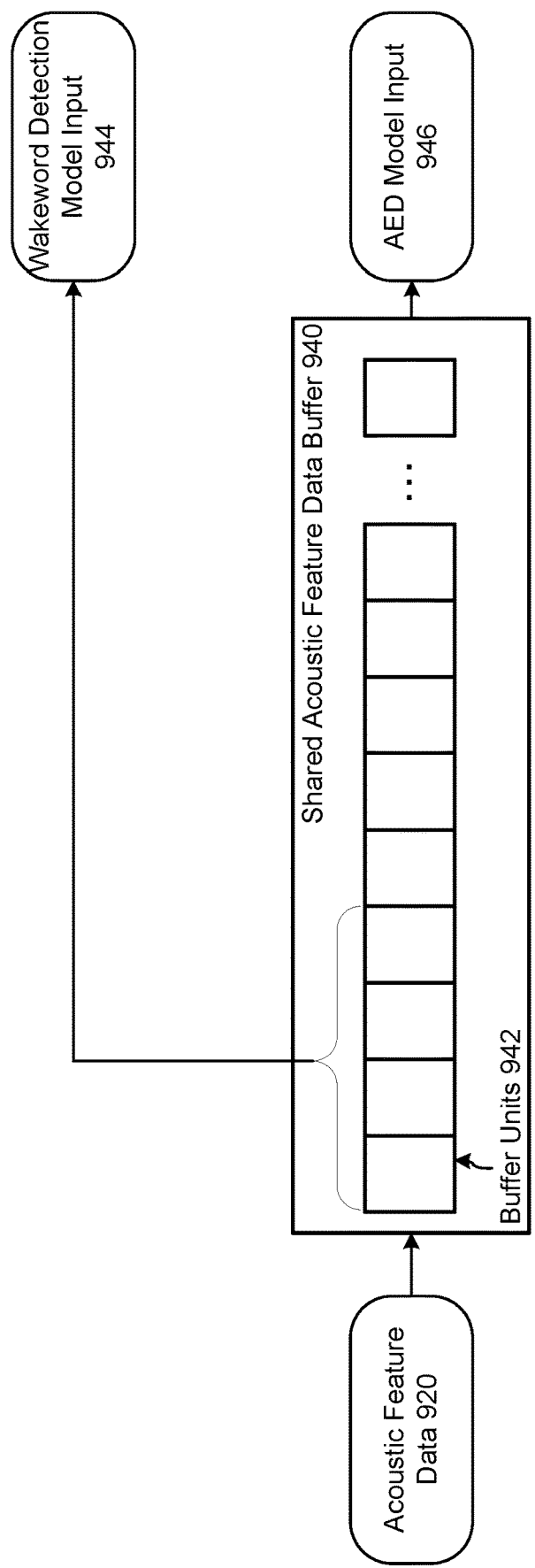

FIG. 9B is an illustration of a shared acoustic feature data buffer 940. In these embodiments, the AED model input 946 is generated as described above. The wakeword-detection model input 944, however, does not have its own buffer; it simply sources a first number of acoustic feature vectors of the shared data buffer 940 to generate the wakeword-detection model input 944. For example, if the AED model input 946 is 1000 frames in size, for each new frame, the wakeword-detection model input 944 may comprise the first 80 frames of the shared acoustic feature data buffer 940.

Figure 10:
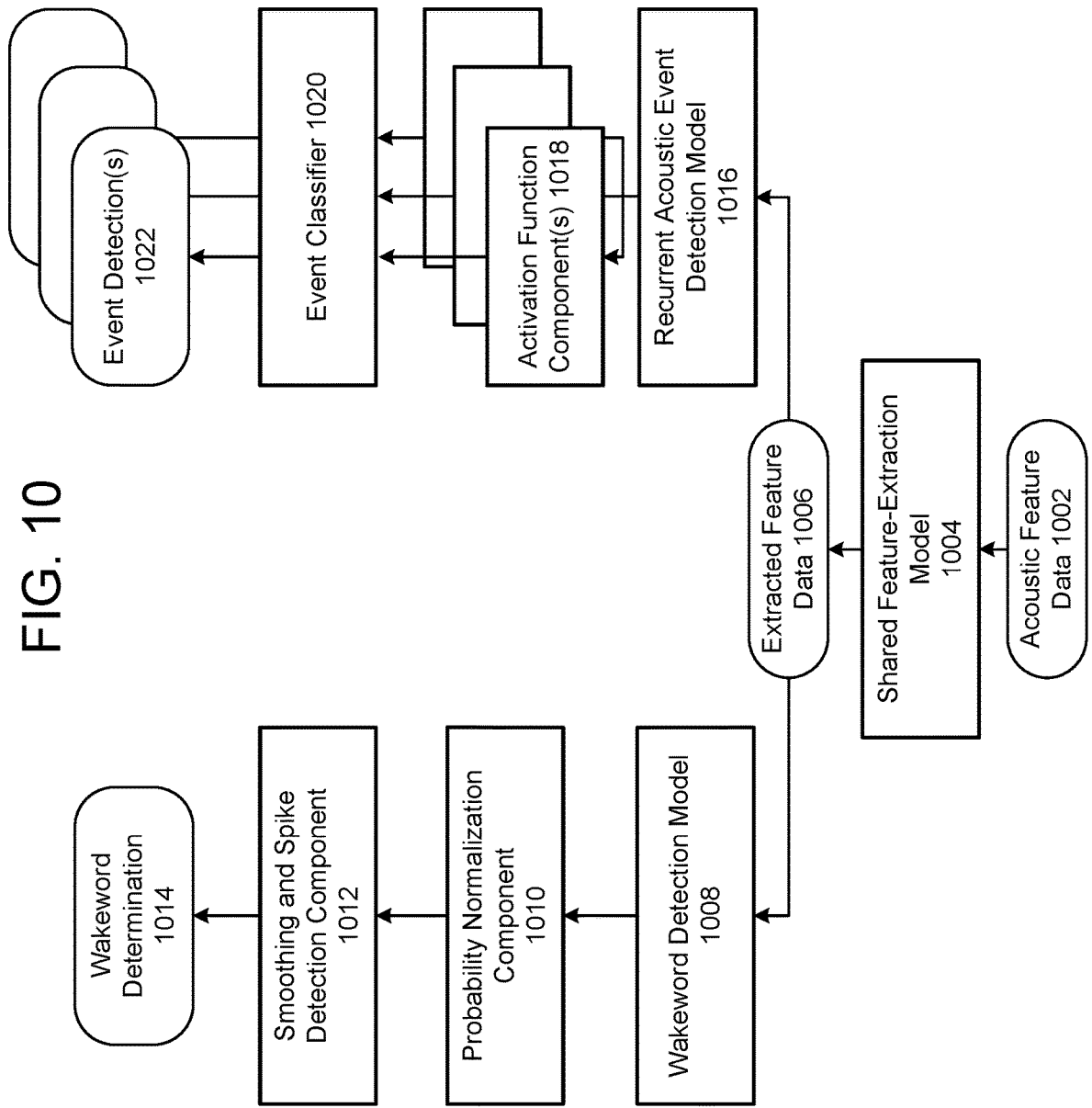
FIG. 10 illustrates a system for detecting acoustic events and wakewords using shared a feature-extraction model according to embodiments of the present disclosure.

FIG. 10 illustrates a system for detecting acoustic events and wakewords using a shared feature-extraction model according to embodiments of the present disclosure. Acoustic feature data 1002 is generated as described above. A shared feature-extraction model 1004 extracts further feature data 1006 from the acoustic feature data 1002. The shared feature-extraction model 1004 may be implemented using a RNN, a CNN, or other network. The present disclosure is not limited to any particular type of network for the shared feature-extraction model 1004.

The shared feature-extraction model 1004 may include a number of nodes arraigned in one or more layers. Each node may be a computational unit that has one or more weighted input connections, a transfer function that combines the inputs in some way, and an output connection. If the shared feature-extraction model 1004 is a CNN model, it may perform a convolution operation using the LBFE data 1002; the CNN model may further perform a rectification function using, for example, a rectified linear unit (ReLu) to increase non-linearity of the CNN model, and/or may perform a flattening function to combine a matrix of values into a single vector.

As described above, the shared feature-extraction model 1004 may be trained using ML techniques and training data. The training data may include audio samples of utterances of the wakeword by different speakers and/or representations of an acoustic event under different conditions. The training data may further include non-wakeword words and/or other acoustic events and annotation data indicating which words are wakewords, which events are of interest, and which words are non-wakeword words and which acoustic events are not of interest. The shared feature-extraction model 1004 may be trained by processing the training data, evaluating the accuracy of its response against the annotation data, and updating the shared feature-extraction model 1004 via, for example, gradient descent. The shared feature-extraction model 1004 may be deemed trained when it is able to predict utterance of the wakeword and/or predict occurrence of an acoustic event in non-training data within a required accuracy.

The output extracted feature data 1006 of the shared feature-extraction model 1004 may be extracted features that may include higher-level audio properties, such as tone or pitch, or other properties determined by the ML training that do not necessarily map to real-world properties. The other components of the system of FIG. 10, including a wakeword-detection model 1008, a probability normalization component 1010, a smoothing and spike-detection component 1012, a AED network 1016, activation function components 1018, and an event classifier 1020, may be analogous to the similar components described above, but may have different numbers of layers, nodes per lay, or node weights. The system of FIG. 10 may similarly generate a wakeword determination 1014 or one or more event detection 1022.

Figure 11:
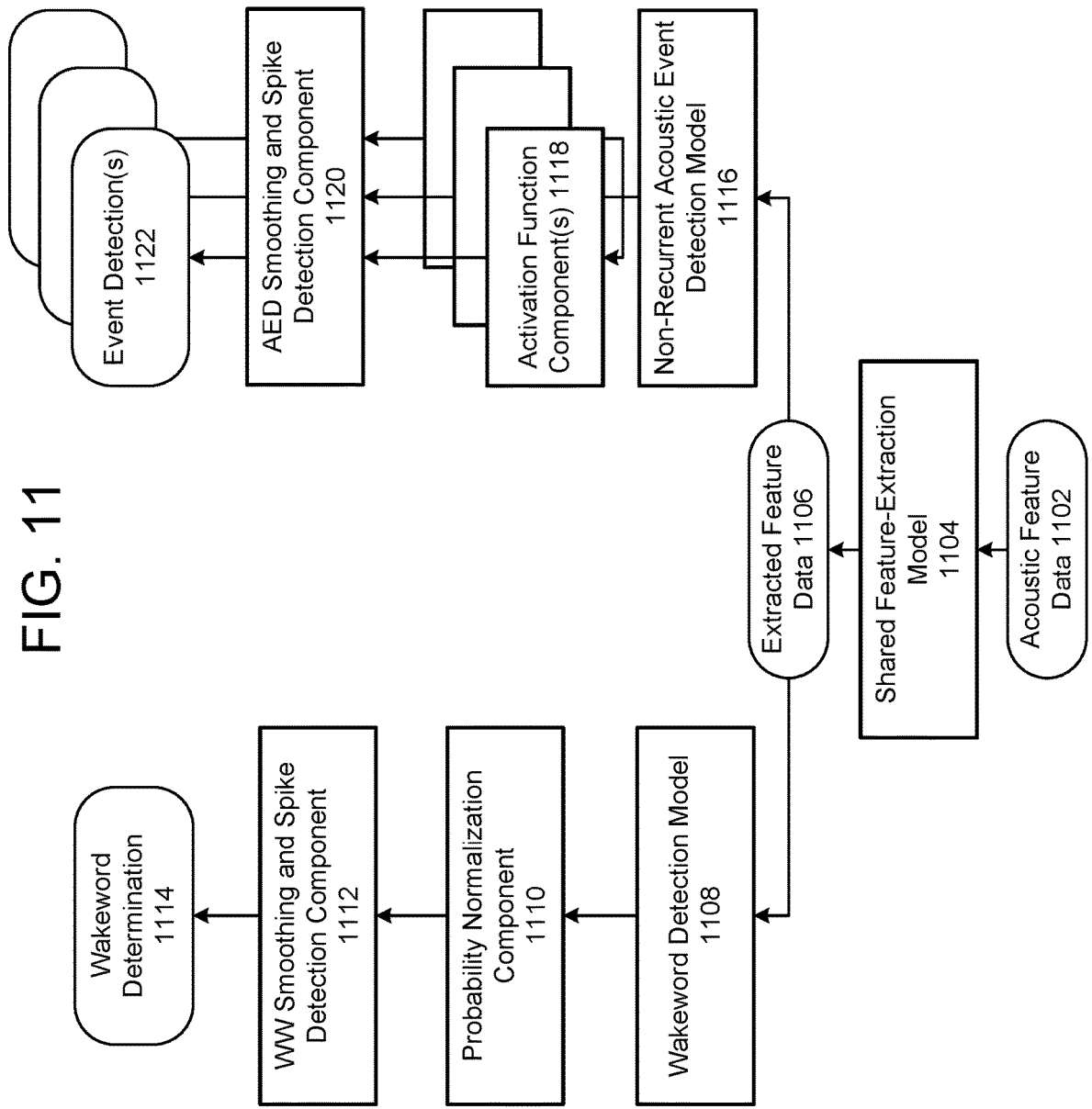
FIG. 11 illustrates a system for detecting acoustic events and wakewords using shared a feature-extraction model and smoothing according to embodiments of the present disclosure.

FIG. 11 illustrates a system for detecting acoustic events and wakewords using a shared feature-extraction model and smoothing according to embodiments of the present disclosure. Like the system of FIG. 10, the system of FIG. 11 includes components analogous to those of the above-referenced figures: a shared feature-extraction model 1104 that receives LFBE data 1102 and generates extracted feature data 1106, a wakeword-decision model 1108 that generates wakeword probabilities based on the extracted feature data 1106, a probability normalization component 1110 that, using a softmax function or other such function, normalizes the probabilities generated by the wakeword-decision model 1108, and a smoothing and spike-detection component 1112 that smooths the output of the probability normalization component 910 and detects spikes therein to determine a wakeword determination 1114.

Also like the system of FIG. 10, AED is also performed using the extracted feature data 1106. Unlike the system of FIG. 10, a non-recurrent AED model 1116 processes the extracted feature data 1106. This non-recurrent AED model 1126 may include a CNN, DNN, or other such non-recurrent model, as described above.

A number of activation function components 1118—one for each acoustic event—may be used to apply an activation function to the probability of occurrence of that event output by the non-recurrent AED model 1126. The activation function may transform the probability data such that probabilities near 50% are increased or decreased based on how far away from 50% they lie; probabilities closer to 0% or 100% may be affected less or even not at all. The activation function thus provides a mechanism to transform a broad spectrum of probabilities—which may be evenly distributed between 0% and 100%—into a binary distribution of probabilities, in which most probabilities lie closer to either 0% or 100%.

Unlike the system of FIG. 10, a smoothing and spike-detection component 1120 receives the output of the activation functions 1118, smooths the output, and detects spikes in the output to determine an event detection 1122. Smoothing refers to a process of averaging the output of the activation functions 1118 across a number of frames; the average may be computed at every frames or at every few frames. In some embodiments, the average is taken every 50 frames. The entire average may be computed for each group of frames; in other embodiments, a running average is maintained and updated every frame or every few frames. Computing the running average may include removing, from the data used to compute the average, the output of the activation functions 1118 corresponding to an oldest frame (e.g., the $51^{st}$ frame if the average is taken over 50 frames), adding, to the data used to compute the average, the output of the activation functions 1118 corresponding to a newest frame (e.g., the $1^{st}$ frame if the average is taken over 50 frames), and re-computing the average. The outputs of the activation functions 1118 may be weighted prior to taking the average to, for example, emphasize newer frames over older frames. A separate average may be computed for each wakeword.

The smoothing and spike-detection component 1120 may then simply compare the average to a threshold, and each event detection 1122 may indicate that an acoustic even is present in the acoustic feature data 1102 (and which event) if that corresponding event's average is greater than the threshold. The smoothing and spike-detection component 1120 may instead determine not just that the average is greater than the threshold, but also that the average is greater than the threshold for a certain minimum number of frames. This spike detection ensures that an erroneous single-frame increase of the average above the threshold does not trigger detection of the wakeword. The minimum with of the spike may be 40 frames (e.g., at least half of the time of the utterance of the wakeword).

Figure 12:
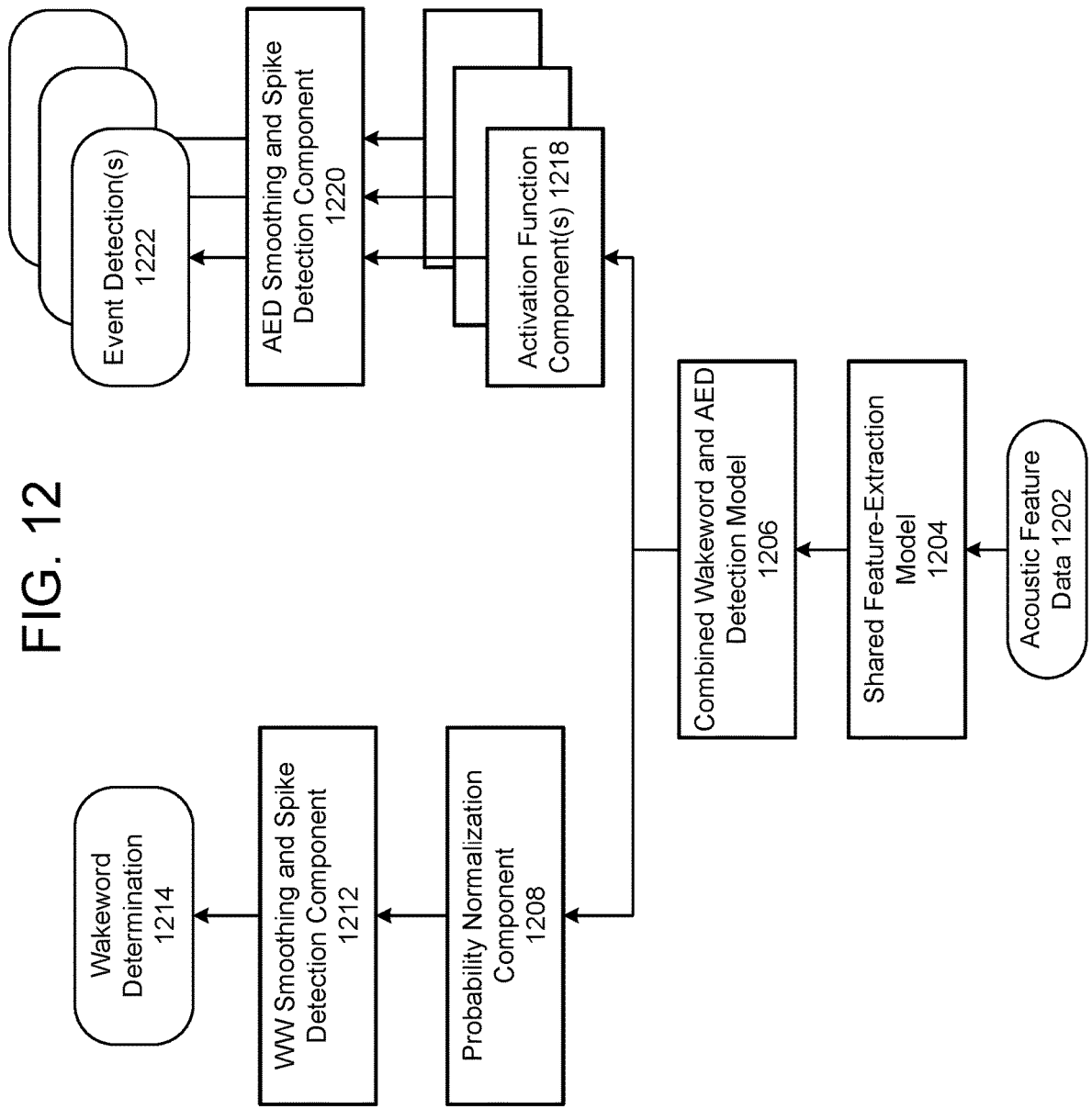
FIG. 12 illustrates a first system for detecting acoustic events and wakewords using a shared model according to embodiments of the present disclosure.

FIG. 12 illustrates a system for detecting acoustic events and wakewords using a shared model according to embodiments of the present disclosure. In these embodiments, the wakeword-detection model 1108 (of FIG. 11) and AED model 1016 (of FIG. 10) are combined into a single combined wakeword-detection and AED model 1206. Similarly, a shared feature-extraction model 1204 processes acoustic feature data 1202 to generate extracted feature data 1206. The output of the shared feature-extraction model 1204 is used by a probability normalization component 1210 and a smoothing and then a spike-detection component 1212 to determine a wakeword determination 1214, as described above.

The output of the combined wakeword and AED detector 1206 is also, for the purposes of AED, received by one or more activation function components 1218, the output of which is then processed by a smoothing and spike detection component 1220 to determine one or more event detection(s) 1222.

Figure 13:
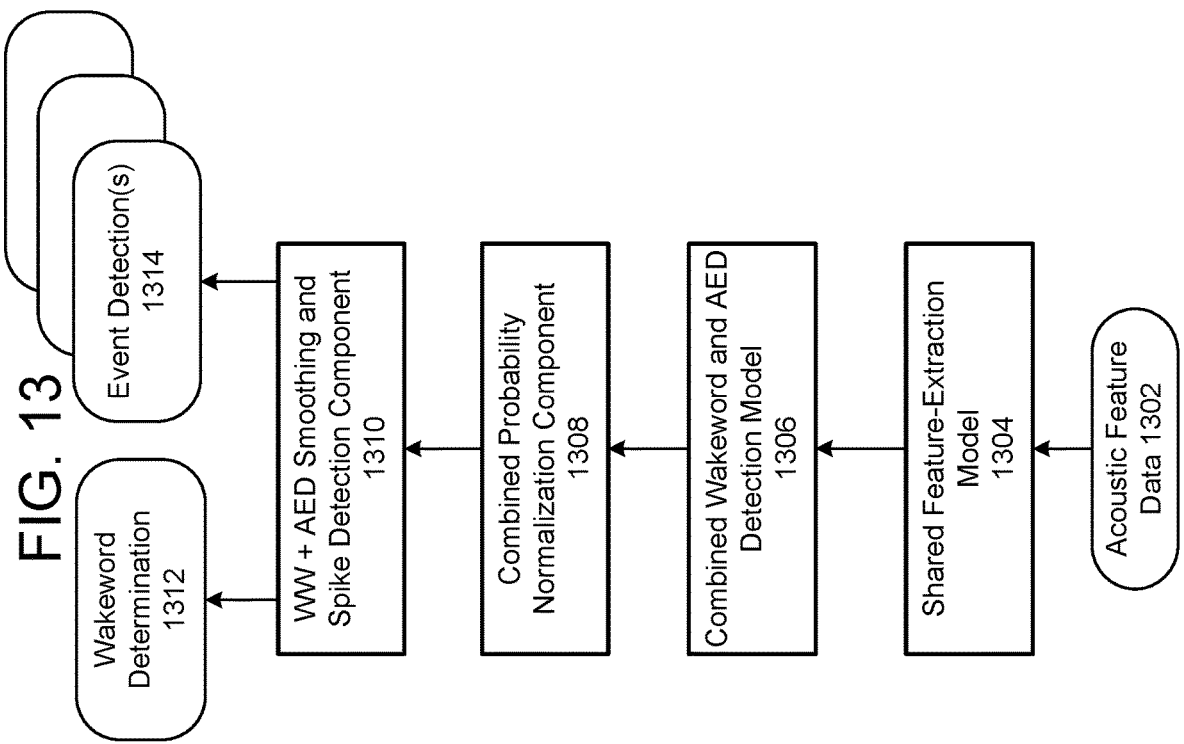
FIG. 13 illustrates a second system for detecting acoustic events and wakewords using a shared model according to embodiments of the present disclosure.

FIG. 13 illustrates a system for detecting acoustic events and wakewords using a shared model according to embodiments of the present disclosure. In this system, a shared feature-extraction model 1304 processes acoustic feature data 1302 and sends its output to the above-described combined wakeword-detection and AED model 1306. A combined probability normalization component 1308 determines a probability that the acoustic feature data 1302 corresponds to either one or more wakewords or one or more acoustic events. A combined smoothing and spike-detection component 1310 performs smoothing and spike detection on the output of the combined probability normalization component 1308, as described above, to determine either a wakeword determination 1312 and/or an event detection 1314.

Figure 14:
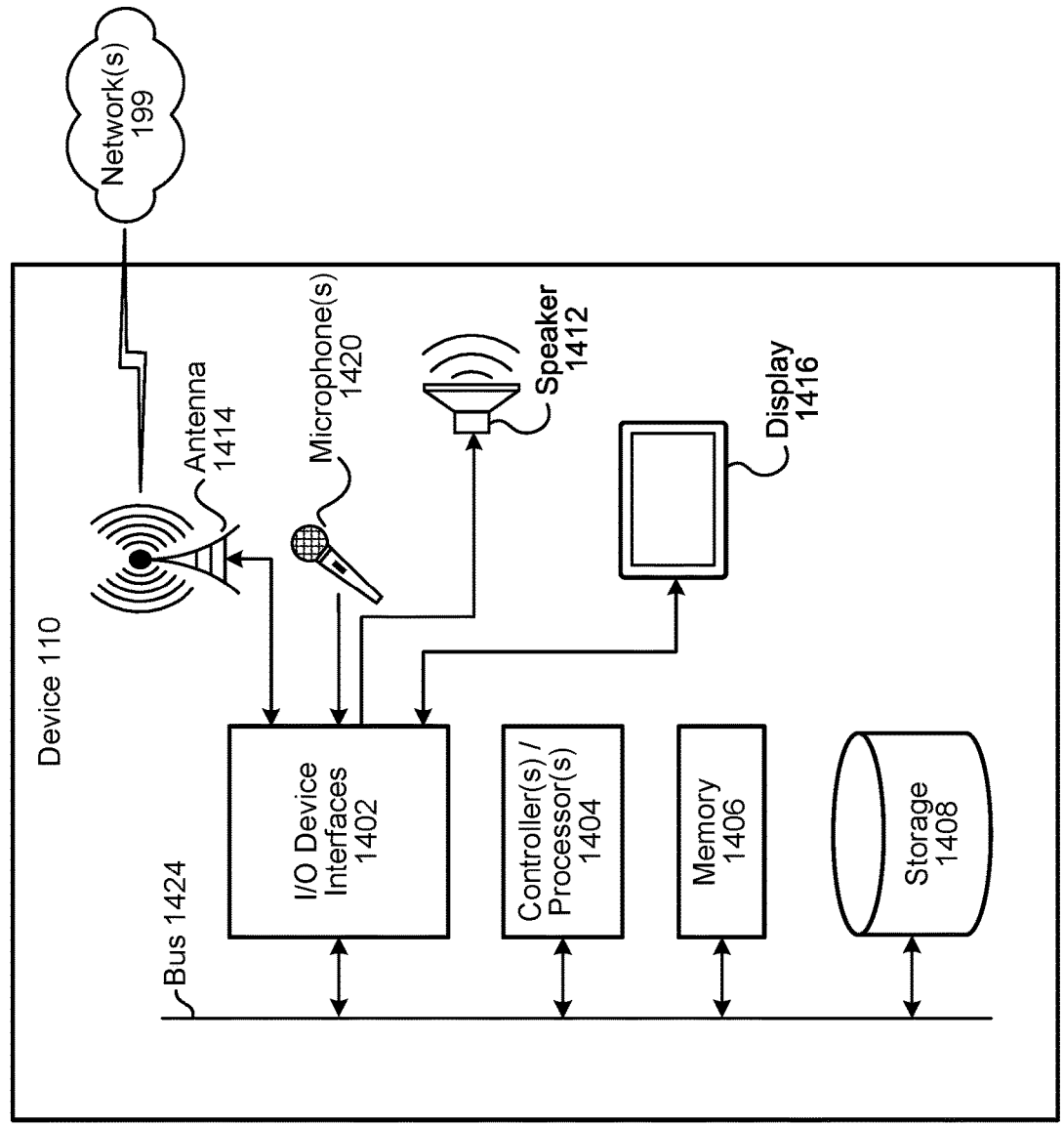
FIG. 14 is a block diagram conceptually illustrating example components of a device according to embodiments of the present disclosure.
Figure 15:
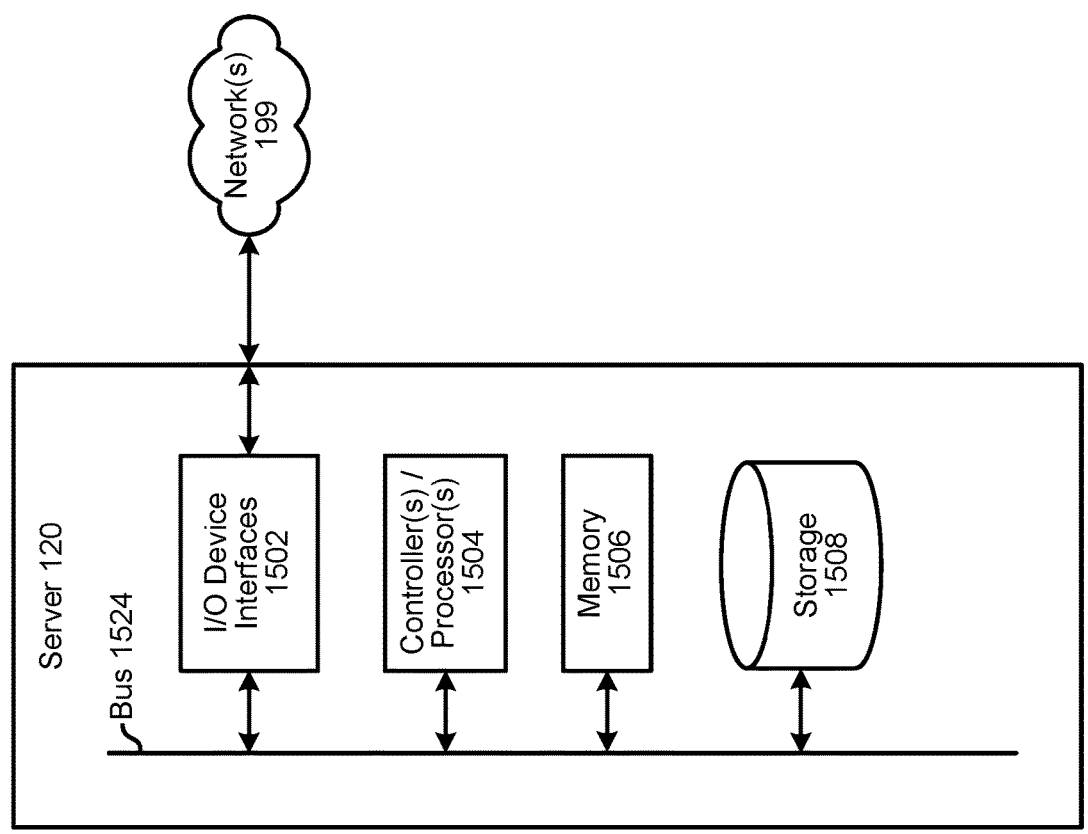
FIG. 15 is a block diagram conceptually illustrating example components of a server according to embodiments of the present disclosure.

FIG. 14 is a block diagram conceptually illustrating a device 110 that may be used with the system. FIG. 15 is a block diagram conceptually illustrating example components of a remote device, such as the server(s) 120. Either the device 110, the server(s) 120, or some combination thereof may perform the wakeword and/or acoustic event detection as described herein. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers (120) may be included in the system, such as one or more servers 120 for performing various operations. In operation, each of these devices (or groups of devices) may include computer-readable and computer-executable instructions that reside on the respective device (110/120), as will be discussed further below.

Each of these devices (110/120) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/120) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1402/1502).

Computer instructions for operating each device (110/120) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/120) includes input/output device interfaces (1402/1502). A variety of components may be connected through the input/output device interfaces (1402/1502), as will be discussed further below. Additionally, each device (110/120) may include an address/data bus (1424/1524) for conveying data among components of the respective device. Each component within a device (110/120) may also be directly connected to other components in addition to (or instead of) being connected to other components across the bus (1424/1524).

Referring to FIG. 14, the device 110 may include input/output device interfaces 1402 that connect to a variety of components such as an audio output component such as a speaker 1412, a wired headset or a wireless headset (not illustrated), or other component capable of outputting audio. The device 110 may also include an audio capture component. The audio capture component may be, for example, a microphone 1420 or array of microphones, a wired headset or a wireless headset (not illustrated), etc. If an array of microphones is included, approximate distance to a sound's point of origin may be determined by audio localization based on time and amplitude differences between sounds captured by different microphones of the array. The device 110 may additionally include a display 1416 for displaying content. The device 110 may further include a camera 1418. One or more device(s) 110 may capture audio data that may be used for purposes of acoustic event detection as described herein. The audio captured, and resulting audio data, may be used as described herein to detect and locate (for example within the audio data) a representation of an acoustic event.

Via antenna(s) 1414, the input/output device interfaces 1402 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1402/1502) may also include communication components that allow data to be exchanged between devices such as different physical servers in a collection of servers or other components.

The components of the device(s) 110 or the server(s) 120 may include their own dedicated processors, memory, and/or storage. Alternatively, one or more of the components of the device(s) 110 or the server(s) 120 may utilize the I/O interfaces (1402/1502), processor(s) (1404/1504), memory (1406/1506), and/or storage (1408/1508) of the device(s) 110 or server(s) 120, respectively.

As noted above, multiple devices may be employed in a single system. In such a multi-device system, each of the devices may include different components for performing different aspects of the system's processing. The multiple devices may include overlapping components. The components of the device 110 and the server(s) 120 as described herein, are illustrative, and may be located as a stand-alone device or may be included, in whole or in part, as a component of a larger device or system.

Figure 16:
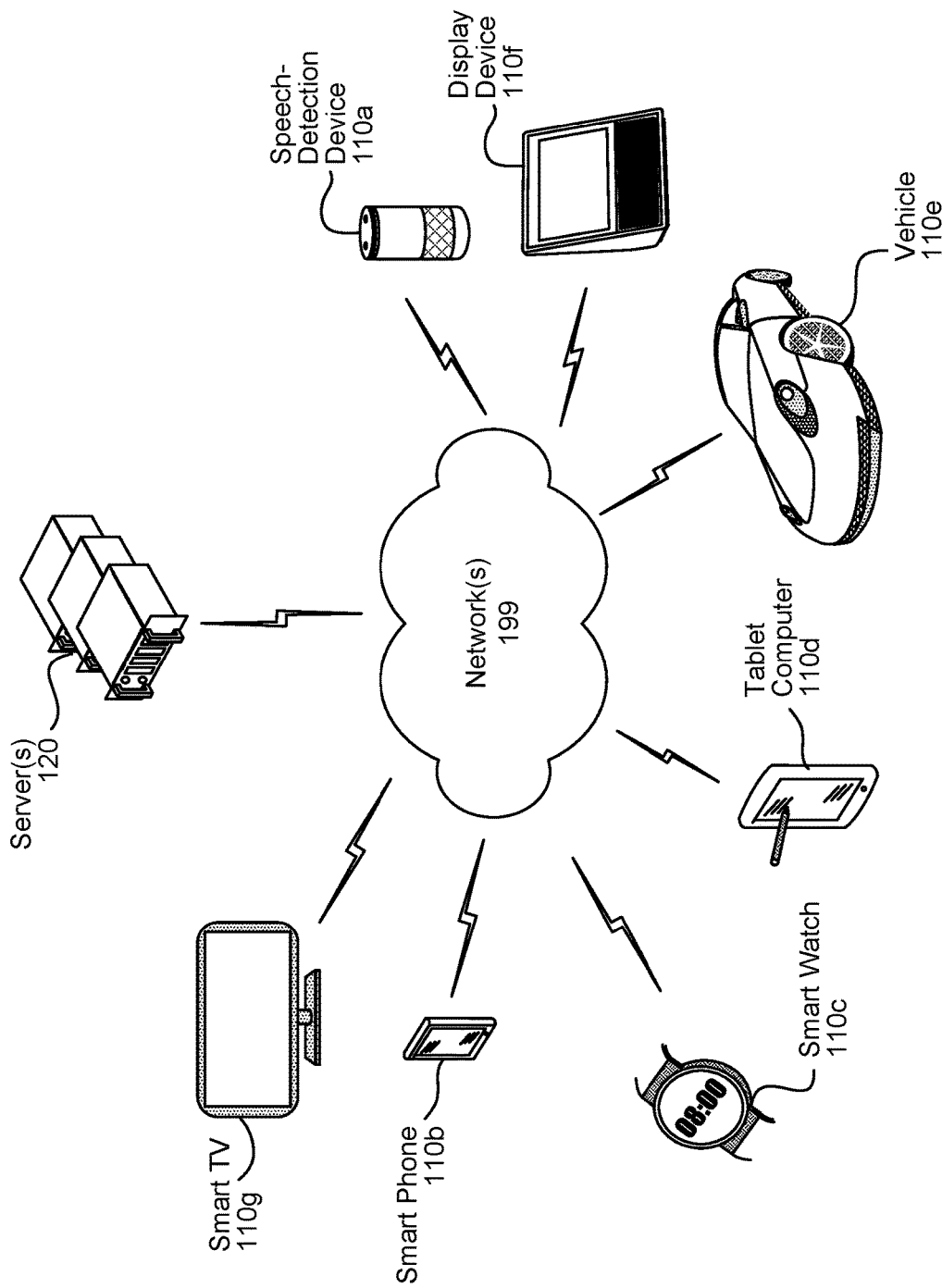
FIG. 16 illustrates an example of a computer network for use with the herein-described system.

As illustrated in FIG. 16, multiple devices (110a-110g, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the server(s) 120, and/or others. The support devices may connect to the network(s) 199 through a wired connection or wireless connection. Networked devices may capture audio using one-or-more built-in or connected microphones or other audio capture devices, with processing one or more servers 120.

The components discussed above may be operated as software, hardware, firmware, or some other combination of computing components. The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   determining a feature vector representing at least one frame of audio data;
   determining, using a first model and the feature vector, first output data corresponding to a likelihood that the at least one frame includes a representation of at least part of a word; and
   determining, using a second model different from the first model and the feature vector, second output data corresponding to a likelihood that the at least one frame includes a representation of at least part of a non-speech acoustic event, wherein determination of the second output data is performed independently of the first output data.

2. The computer-implemented method of claim 1, further comprising:
   processing the first output data using a normalization component to determine first probability data.

3. The computer-implemented method of claim 1, further comprising:
   processing the second output data using at least one activation function component to determine the second output data.

4. The computer-implemented method of claim 3, further comprising:
   processing the second output data using a classifier to detect an occurrence of the non- speech acoustic event.

5. The computer-implemented method of claim 1, wherein the non-speech acoustic event comprises a non-speech sound made by a human.

6. The computer-implemented method of claim 1, wherein the first output data corresponds to a likelihood that the at least one frame includes a representation of at least part of a first wakeword.

7. The computer-implemented method of claim 6, further comprising:
   determining, using the feature vector, third output data corresponding to a likelihood that the at least one frame includes a representation of at least part of a second wakeword.

8. The computer-implemented method of claim 1, further comprising:
   receiving the at least one frame of audio data; and
   processing the at least one frame of audio data using a feature-extraction model to determine the feature vector, the feature-extraction model configured to determine feature output data operable by both the first model and the second model, wherein determining the first output data comprises processing the feature vector using the first model, and
wherein determining the second output data comprises processing the feature vector using the second model.

9. The computer-implemented method of claim 1, wherein the feature vector represents acoustic feature data and the method further comprises:
processing the feature vector using a feature-extraction model to determine a second feature vector, the feature-extraction model configured to determine feature output data operable by both the first model and the second model,
wherein determining the first output data comprises processing the second feature vector using the first model, and
wherein determining the second output data comprises processing the second feature vector using the second model.

10. The computer-implemented method of claim 1, wherein:
determining the first output data comprises:
processing the feature vector using a feature extraction component to determine first feature data, and
processing the first feature data using the first model to determine the first output data; and
determining the second output data comprises:
processing the feature vector using the feature extraction component to determine second feature data, and
processing the second feature data using the second model to determine the second output data.

11. The computer-implemented method of claim 1, wherein:
the feature vector represents acoustic feature data;
the first model comprises a feature extraction component;
determining the first output data comprises:
processing the feature vector using the first model to determine a second feature vector, and
using the second feature vector to determine the first output data; and
determining the second output data comprises using the second feature vector and the second model to determine the second output data.

12. A system comprising:
at least one processor; and
at least one memory comprising instructions that, when executed by the at least one processor, cause the system to:
determine a feature vector representing at least one frame of audio data;
determine, using a first model and the feature vector, first output data corresponding to a likelihood that the at least one frame includes a representation of at least part of a wakeword; and
determine, using a second model different from the first model and the feature vector, second output data corresponding to a likelihood that the at least one frame includes a representation of at least part of a non-speech acoustic event, wherein determination of the second output data is performed independently of the first output data.

13. The system of claim 12, wherein the at least one memory further comprises instructions that, when executed by the at least one processor, further cause the system to:
process the first output data using a normalization component to determine first probability data.

14. The system of claim 12, wherein the at least one memory further comprises instructions that, when executed by the at least one processor, further cause the system to:
process the second output data using at least one activation function component to determine the second output data.

15. The system of claim 14, wherein the at least one memory further comprises instructions that, when executed by the at least one processor, further cause the system to:
process the second output data using a classifier to detect an occurrence of the non- speech acoustic event.

16. The system of claim 12, wherein the non-speech acoustic event comprises a non-speech sound made by a human.

17. The system of claim 12, wherein the first output data corresponds to a likelihood that the at least one frame includes a representation of at least part of a first wakeword.

18. The system of claim 17, wherein the at least one memory further comprises instructions that, when executed by the at least one processor, further cause the system to:
determine, using the feature vector, third output data corresponding to a likelihood that the at least one frame includes a representation of at least part of a second wakeword.

19. The system of claim 12, wherein the at least one memory further comprises instructions that, when executed by the at least one processor, further cause the system to:
receive the at least one frame of audio data; and
process the at least one frame of audio data using a feature-extraction model to determine the feature vector, the feature-extraction model configured to determine feature output data operable by both the first model and the second model,
wherein the instructions that cause the system to determine the first output data comprise instructions that, when executed by the at least one processor, further cause the system to process the feature vector using the first model, and
wherein the instructions that cause the system to determine the second output data comprise instructions that, when executed by the at least one processor, further cause the system to process the feature vector using the second model.

20. The system of claim 12, wherein the feature vector represents acoustic feature data and wherein the at least one memory further comprises instructions that, when executed by the at least one processor, further cause the system to:
process the feature vector using a feature-extraction model to determine a second feature vector, the feature-extraction model configured to determine feature output data operable by both the first model and the second model,
wherein the instructions that cause the system to determine the first output data comprise instructions that, when executed by the at least one processor, further cause the system to process the second feature vector using the first model, and
wherein the instructions that cause the system to determine the second output data comprise instructions that, when executed by the at least one processor, further cause the system to process the second feature vector using the second model.

21. The system of claim 12, wherein:
the instructions that cause the system to determine the first output data comprise instructions that, when executed by the at least one processor, further cause the system to:

process the feature vector using a feature extraction component to determine first feature data, and process the first feature data using the first model to determine the first output data; and the instructions that cause the system to determine the second output data comprise instructions that, when executed by the at least one processor, further cause the system to:

process the feature vector using the feature extraction component to determine second feature data, and process the second feature data using the second model to determine the second output data.

22. The system of claim 12, wherein:

the feature vector represents acoustic feature data;

the first model comprises a feature extraction component;

the instructions that cause the system to determine the first output data comprise instructions that, when executed by the at least one processor, further cause the system to:

process the feature vector using the first model to determine a second feature vector, and use the second feature vector to determine the first output data; and the instructions that cause the system to determine the second output data comprise instructions that, when executed by the at least one processor, further cause the system to use the second feature vector and the second model to determine the second output data.

\* \* \* \* \*